(12) United States Patent
Appleby et al.

(10) Patent No.: US 11,479,104 B2
(45) Date of Patent: Oct. 25, 2022

(54) SYSTEM AND METHOD FOR GAS TURBINE ENGINE MOUNT WITH SEAL

(71) Applicant: HONEYWELL INTERNATIONAL INC., Morris Plains, NJ (US)

(72) Inventors: Andrew Appleby, Phoenix, AZ (US); Laurence Liston, Gilbert, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 669 days.

(21) Appl. No.: 16/521,009

(22) Filed: Jul. 24, 2019

(65) Prior Publication Data

US 2021/0023928 A1    Jan. 28, 2021

(51) Int. Cl.

| F02C 7/20 | (2006.01) |
|---|---|
| F02C 7/25 | (2006.01) |
| F02C 7/28 | (2006.01) |
| F02C 7/32 | (2006.01) |
| F16L 5/10 | (2006.01) |
| B60K 5/12 | (2006.01) |
| B64D 27/26 | (2006.01) |

(52) U.S. Cl.
CPC .......... *B60K 5/1233* (2013.01); *B60K 5/1216* (2013.01); *B60K 5/1283* (2013.01); *B64D 27/26* (2013.01); *F02C 7/20* (2013.01); *F02C 7/25* (2013.01); *F02C 7/28* (2013.01); *F02C 7/32* (2013.01); *F16L 5/10* (2013.01); *B64D 2027/262* (2013.01)

(58) Field of Classification Search
CPC ...... F02C 7/00; F02C 7/24; F02C 7/25; F02C 7/28; F02C 7/32; F16L 5/00; F16L 5/10; B60K 5/00; B60K 5/12; B60K 5/1216; B60K 5/1233; B60K 5/1283; B64D 27/00; B64D 27/26; B64D 2027/262; B64D 2027/264; B64D 2027/266; B64D 2027/268
USPC ......................................................... 277/590
See application file for complete search history.

(56) References Cited

U.S. PATENT DOCUMENTS

| 1,751,743 | A | | 3/1930 | Vincent | |
|---|---|---|---|---|---|
| 4,065,077 | A | | 12/1977 | Brooks | |
| 4,216,651 | A | | 8/1980 | Ormerod | |
| 4,742,975 | A | | 5/1988 | Pachomoff et al. | |
| 5,458,343 | A | * | 10/1995 | Dornfeld | F16L 5/08 |
| | | | | | 277/503 |
| 5,649,417 | A | | 7/1997 | Hey | |
| 5,836,048 | A | * | 11/1998 | Rossman | H02G 3/083 |
| | | | | | 16/2.2 |
| 5,860,623 | A | * | 1/1999 | Dunstan | B64D 27/26 |
| | | | | | 244/54 |

(Continued)

FOREIGN PATENT DOCUMENTS

| FR | 2981048 B1 | 12/2013 |
|---|---|---|
| FR | 3068008 A1 | 12/2018 |

*Primary Examiner* — Nathan Cumar
(74) *Attorney, Agent, or Firm* — Lorenz & Kopf, LLP

(57) ABSTRACT

A seal for a wall of a vehicle includes a first plate that defines a first slot, and the first plate is to be coupled to the wall. The seal includes a second plate that defines a guide that extends outwardly from the second plate. The second plate is positioned adjacent to the first plate such that the guide is in communication with the first slot. The seal includes a third plate that defines a second slot that receives the guide, and the third plate is positioned adjacent to the second plate and is to be coupled to the wall.

20 Claims, 22 Drawing Sheets

(56) References Cited

U.S. PATENT DOCUMENTS

| | | |
|---|---|---|
| 6,715,746 B2 | 4/2004 | Bachmeyer et al. |
| 7,165,743 B2 | 1/2007 | Pasquer et al. |
| 7,325,770 B2 | 2/2008 | Chevalier et al. |
| 7,527,220 B2 | 5/2009 | Dron |
| 7,828,298 B2 * | 11/2010 | Cummings ............... A62C 2/06 277/502 |
| 8,146,856 B2 | 4/2012 | Combes et al. |
| 8,950,702 B2 | 2/2015 | Cloft |
| 9,211,955 B1 | 12/2015 | Mauldin et al. |
| 9,238,510 B2 * | 1/2016 | Brochard ............... B64D 27/26 |
| 9,488,216 B2 | 11/2016 | Godiot et al. |
| 9,701,412 B2 | 7/2017 | Stretton et al. |
| 9,938,025 B2 | 4/2018 | Faure et al. |
| 10,066,552 B2 | 9/2018 | Jiang et al. |
| 2007/0138337 A1 | 6/2007 | Audart-Noel et al. |
| 2008/0265526 A1 | 10/2008 | Cummings |
| 2010/0181417 A1 | 7/2010 | Combes et al. |
| 2011/0114786 A1 | 5/2011 | Guillet et al. |
| 2013/0232768 A1 | 9/2013 | Suciu et al. |
| 2013/0292888 A1 | 11/2013 | Hwang et al. |
| 2015/0008305 A1 | 1/2015 | Loeffelsender et al. |
| 2015/0028182 A1 | 1/2015 | Kim et al. |
| 2015/0166189 A1 | 6/2015 | Cassagne et al. |
| 2015/0166190 A1 | 6/2015 | Cassagne et al. |
| 2015/0167726 A1 | 6/2015 | Cassagne et al. |
| 2016/0122029 A1 | 5/2016 | Serra et al. |
| 2017/0182875 A1 | 6/2017 | Scharf et al. |
| 2017/0267091 A1 | 9/2017 | Takahashi et al. |
| 2018/0201112 A1 | 7/2018 | Takahashi |
| 2018/0257471 A1 | 9/2018 | Soma |
| 2019/0031010 A1 | 1/2019 | Okita et al. |
| 2019/0054813 A1 | 2/2019 | Tanaka et al. |
| 2019/0055025 A1 | 2/2019 | Gruner et al. |
| 2019/0092484 A1 | 3/2019 | Whiteford et al. |
| 2019/0144124 A1 | 5/2019 | Zameroski |
| 2019/0152615 A1 | 5/2019 | Combes et al. |
| 2019/0217964 A1 | 7/2019 | Alstad et al. |

* cited by examiner

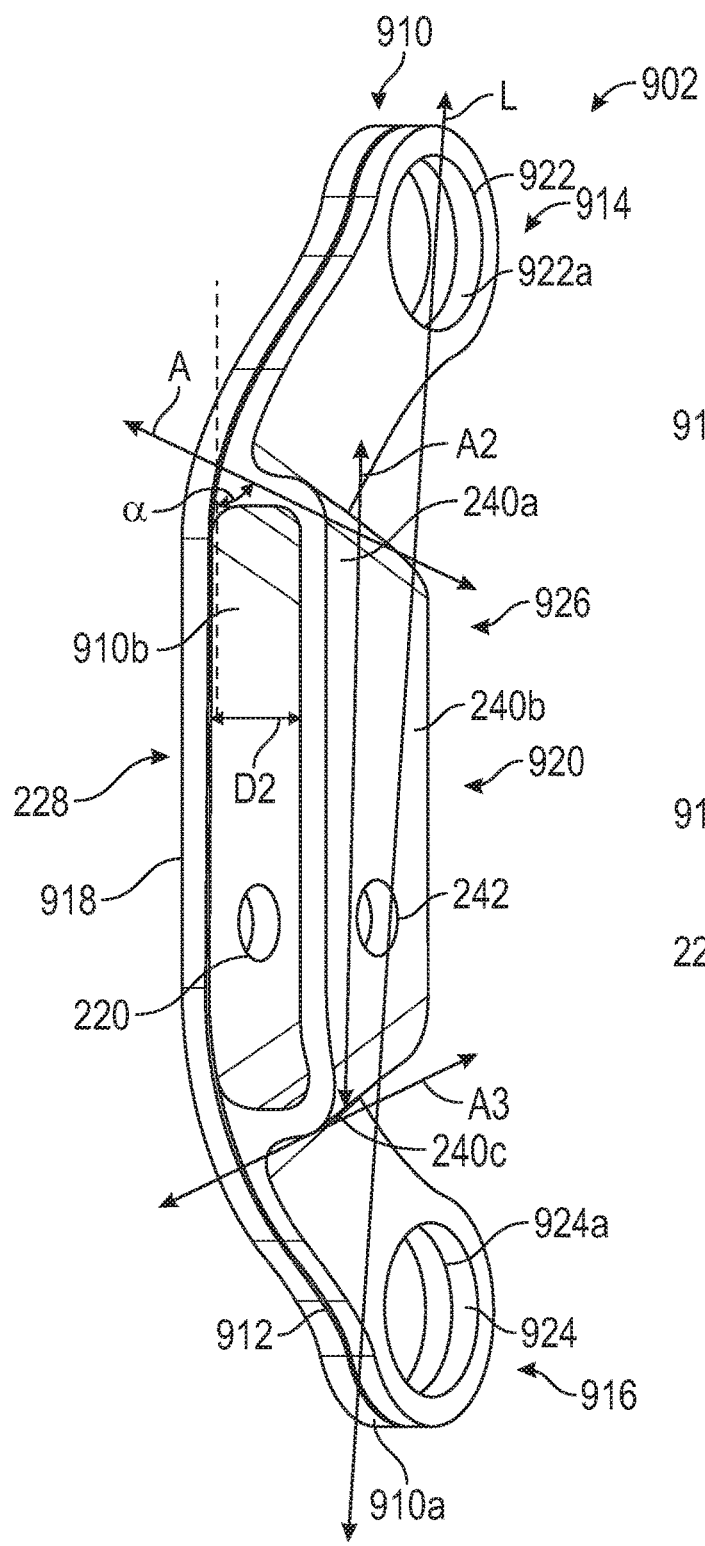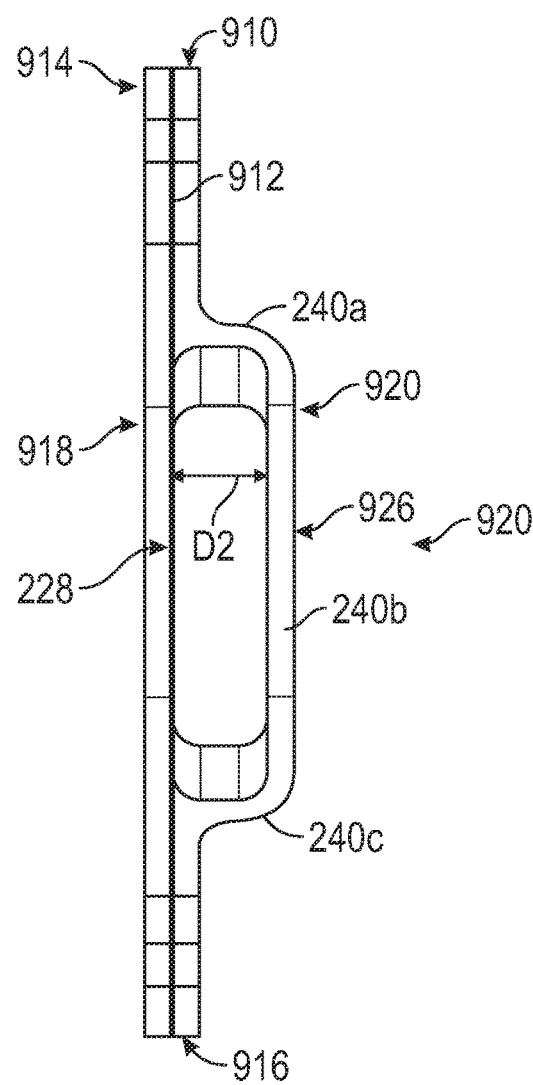
FIG. 9
FIG. 10

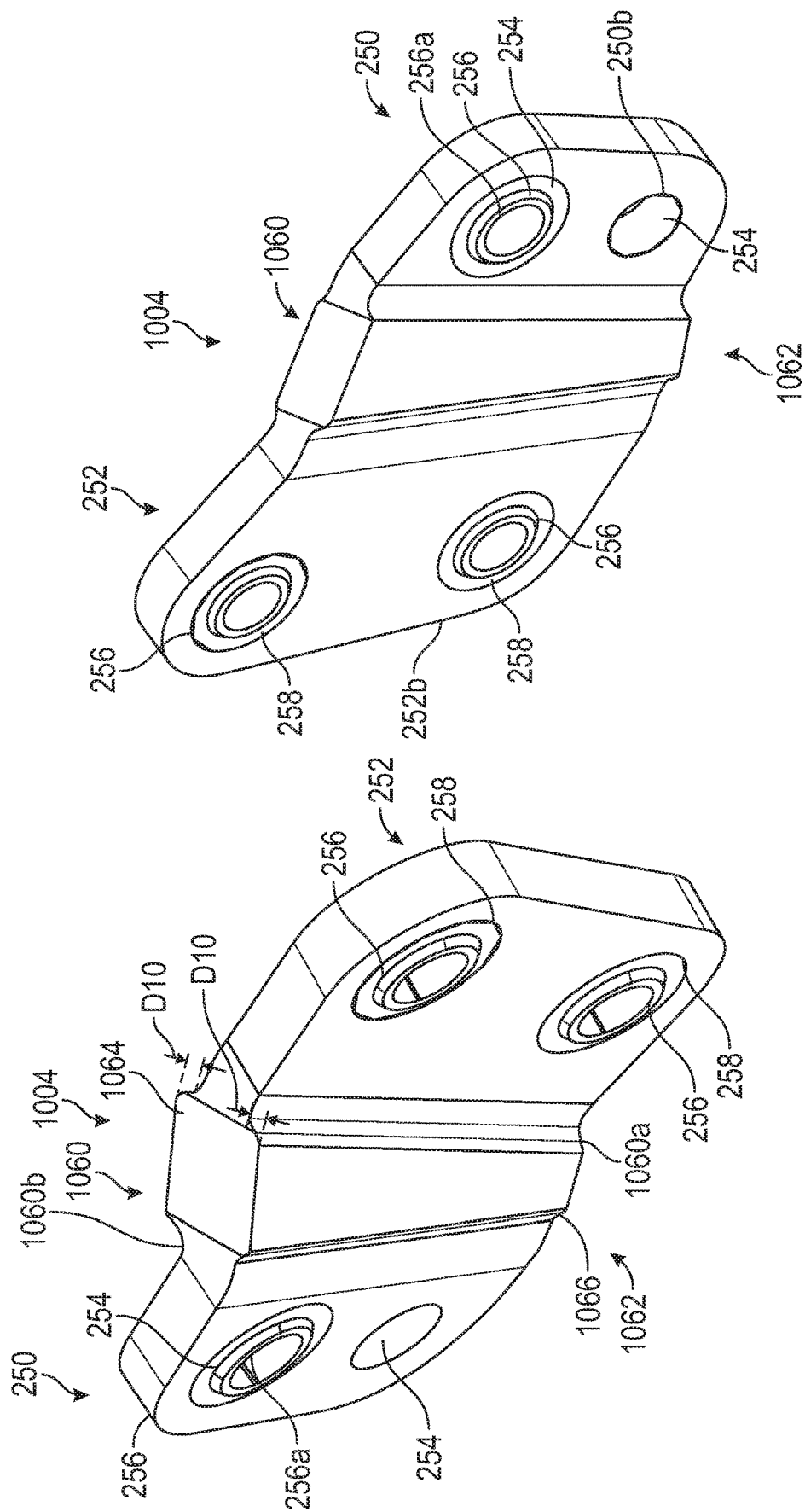

SYSTEM AND METHOD FOR GAS TURBINE ENGINE MOUNT WITH SEAL

TECHNICAL FIELD

The present disclosure generally relates to gas turbine engines, and more particularly relates to a system and a method for a mount for coupling a gas turbine engine to a structure of a vehicle, such as an aircraft, that cooperates with a seal coupled to the structure of the vehicle.

BACKGROUND

Gas turbine engines may be employed to power various devices. For example, a gas turbine engine may be employed to power a vehicle, such as an aircraft. In order to couple the gas turbine engine to the vehicle, one or more engine mount structures are used. Generally, the engine mount structures are planar and require a tight tolerance between the gas turbine engine structure and the vehicle structure in order to enable coupling of the gas turbine engine to the vehicle. In certain instances, due to manufacturing tolerances, for example, the structure of the gas turbine engine may not be properly aligned with the vehicle structure, which results in increased manufacturing costs to reconfigure the structure of the gas turbine engine to properly align with the vehicle structure to enable the coupling of the gas turbine engine to the vehicle with the engine mount structures. In other instances, when the gas turbine engine is mounted to the vehicle with the engine mount structures, the engine mount structures may require removal of a surrounding vehicle structure in order to access the engine mount structures to uncouple the gas turbine engine from the vehicle. Further, in order to couple the gas turbine engine to the vehicle, the structure of the vehicle may include an opening that provides an access point for the vehicle structure. This opening, while enabling the coupling of the gas turbine engine to the vehicle, may provide an entry point for other items into the vehicle.

Accordingly, it is desirable to provide a system and a method for a mount for coupling a gas turbine engine to a vehicle, such as an aircraft, in which the mount may compensate for axial and angular misalignments between the gas turbine engine structure and the vehicle. In addition, it is desirable to provide a system and a method for a mount in which the gas turbine engine may be removed quickly, without requiring removal of any structure of the vehicle and/or the gas turbine engine to access the mount. It is also desirable to provide a seal for use with the mount to inhibit the entry of other items into the vehicle. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a mount for coupling an engine to a vehicle. The mount includes an engine bracket adapted to couple to the engine. The engine bracket includes a body that has a first end opposite a second end, and the body defines an offset coupling portion between the first end and the second end. The offset coupling portion protrudes from the body between the first end and the second end to define a receptacle. The mount includes a vehicle bracket adapted to couple to the vehicle. The vehicle bracket includes a first bracket end opposite a second bracket end. The first bracket end is offset from the second bracket end and the first bracket end is received within the receptacle to couple the engine bracket to the vehicle bracket.

The first end and the second end of the body each define a bore for receiving a fastener assembly adapted to couple the engine bracket to the engine. The fastener assembly includes at least a bolt, a sleeve and a pin, the bolt received within the sleeve, and the pin received through a pin hole defined in the bolt. The body of the engine bracket includes a first member and a second member. The offset coupling portion is defined by the second member, the first member is planar and the first member and the second member cooperate to define the receptacle. The first member includes a first end, a second end opposite the first end and an intermediate portion defined between the first end and the second end. The intermediate portion defines at least one vehicle bracket coupling bore and the intermediate portion is opposed to the offset coupling portion. The offset coupling portion defines at least a second vehicle bracket bore which is coaxially aligned with the at least one vehicle bracket coupling bore of the intermediate section and at least one bore of the first bracket end for receiving at least one second fastener assembly to couple the vehicle bracket to the engine bracket. The at least one second fastener assembly includes at least a bolt, a sleeve bolt and a pin, the bolt received within the sleeve bolt, and the pin received through a pin hole defined in the bolt. The at least one second fastener assembly includes a pin. The offset coupling portion includes a plurality of segments, with a first segment of the plurality of segments extending along an axis that is transverse to a longitudinal axis of the engine bracket, a second segment of the plurality of segments extending along a second axis that is parallel to the longitudinal axis and a third segment of the plurality of segments extending along a third axis that is transverse to the longitudinal axis. The first bracket end is connected to the second bracket end by an intermediate bracket section that extends along a fourth axis, which is transverse to a second longitudinal axis of the vehicle bracket. The first bracket end includes a first bore, the second bracket end includes a second bore, and a spherical bearing is received in each of the first bore and the second bore. The body of the engine bracket includes an offset portion that defines the offset coupling portion and a planar portion. The planar portion and the offset coupling portion cooperate to define the receptacle, and the body includes at least one groove about a perimeter of the body.

Also provided according to various embodiments is a method for removably coupling an engine to a vehicle. The method includes coupling a first end of a body of an engine bracket to the engine; and coupling a second end of the body of the engine bracket to the engine. The second end opposite the first end and the body defining an offset coupling portion between the first end and the second end that protrudes from the body between the first end and the second end to define a receptacle. The method includes coupling a first bracket end of a vehicle bracket to the vehicle; and positioning a second bracket end of the vehicle bracket within the receptacle. The method includes coupling the second bracket end to the offset coupling portion to couple the engine to the vehicle, the engine coupled to the vehicle so as to be offset along a longitudinal axis that extends between the engine bracket and the vehicle bracket.

The method includes uncoupling the second bracket end from the offset coupling portion to remove the engine from the vehicle. The coupling the first end of the body and the second end of the body to the engine includes inserting a first fastener assembly though each of the first end of the body and the second end of the body and through openings defined in at least one mounting flange of the engine to couple the engine to the vehicle. The coupling the first bracket end to the vehicle includes inserting at least one second fastener assembly though a bore defined in the first bracket end of the vehicle bracket and at least one bore defined through the offset coupling portion of the engine bracket.

Further provided is a mount for coupling an engine to a vehicle. The mount includes an engine bracket adapted to couple to the engine. The engine bracket includes a planar first member coupled to a second member. The first member includes a first end, a second end opposite the first end and an intermediate section. The first member directly coupled to the second member along the first end and the second end. The second member defines an offset coupling portion that protrudes from the second member and is opposed from the intermediate section. The first member and the second member cooperate to define a receptacle. The mount includes a vehicle bracket adapted to couple to the vehicle. The vehicle bracket includes a first bracket end opposite a second bracket end. The first bracket end offset from the second bracket end, and the first bracket end is received within the receptacle to couple the engine bracket to the vehicle bracket.

The offset coupling portion includes a plurality of segments, with a first segment of the plurality of segments extending along an axis that is transverse to a longitudinal axis of the engine bracket, a second segment of the plurality of segments extending along a second axis that is parallel to the longitudinal axis and a third segment of the plurality of segments extending along a third axis that is transverse to the longitudinal axis. The mount first bracket end is connected to the second bracket end by an intermediate bracket section that extends along a fourth axis, which is transverse to a second longitudinal axis of the vehicle bracket. The first member and the second member each define a bore for receiving a fastener assembly adapted to couple the engine bracket to the engine, and the intermediate portion defines at least one vehicle bracket coupling bore, the offset coupling portion defines at least a second vehicle bracket bore which is coaxially aligned with the at least one vehicle bracket coupling bore of the intermediate portion and at least one bore of the first bracket end for receiving at least one second fastener assembly to couple the vehicle bracket to the engine bracket.

Also provided according to various embodiments is a seal for a wall of a vehicle. The seal includes a first plate that defines a first slot, and the first plate is configured to be coupled to the wall. The seal includes a second plate that defines a guide that extends outwardly from the second plate. The second plate is positioned adjacent to the first plate such that the guide is in communication with the first slot. The seal includes a third plate that defines a second slot that receives the guide, and the third plate is positioned adjacent to the second plate and configured to be coupled to the wall.

The first plate, the second plate and the third plate are composed of a metal or metal alloy. The guide extends outwardly from the second plate at an angle. The angle is between 30 degrees and 90 degrees. The guide is tapered from a first side to an opposite second side. The first plate includes a first plate flange and a first plate body that defines the first slot, and the first plate body recessed relative to the first plate flange. The third plate includes a third plate flange and a third plate body that defines the second slot, the third plate body recessed relative to the third plate flange and the second plate is sandwiched between the first plate body and the third plate body. The second plate is movable relative to the first plate and the third plate.

Further provided according to various embodiments is a vehicle. The vehicle includes a firewall that defines an opening, and a seal received within the opening. The seal includes a first plate that defines a first slot, and the first plate is coupled to the wall such that at least a portion of the first plate is recessed relative to the opening. The seal includes a second plate that defines a guide that extends outwardly from the second plate, and the second plate is positioned adjacent to the first plate such that the guide is in communication with the first slot. The seal includes a third plate that defines a second slot that receives the guide. The third plate is positioned adjacent to the second plate such that the second plate is sandwiched between the first plate and the third plate, and the third plate is coupled to the wall such that at least a portion of the third plate is recessed relative to the opening.

The guide extends outwardly from the second plate at an angle. The angle is between 30 degrees and 90 degrees. The guide is tapered from a first side to an opposite second side. The first plate includes a first plate flange and a first plate body that defines the first slot, the first plate body recessed relative to the first plate flange. The third plate includes a third plate flange and a third plate body that defines the second slot, the third plate body recessed relative to the third plate flange, and the second plate is sandwiched between the first plate body and the third plate body. The second plate is movable relative to the first plate and the third plate.

Also provided according to various embodiments is a vehicle. The vehicle includes an engine and a mount for coupling the engine to a vehicle structure. The mount includes a vehicle bracket having a seal coupling portion. The vehicle includes a wall that defines an opening, and the firewall positioned adjacent to the vehicle structure. The vehicle includes a seal received within the opening. The seal includes a first plate that defines a first slot, and the first plate coupled to the wall. The seal includes a second plate that defines a guide that extends outwardly from the second plate. The second plate is positioned adjacent to the first plate such that the guide is in communication with the first slot, the guide shaped to correspond to the seal coupling portion and the seal coupling portion is configured to be received within the guide. The seal includes a third plate that defines a second slot that receives the guide, and the third plate is positioned adjacent to the second plate and coupled to the wall.

The seal coupling portion is configured to be received within the guide to define a gap, and a length of the guide and a width of the gap has a ratio of at least ten to one. The guide extends outwardly from the second plate at an angle between 30 degrees and 90 degrees. The first plate includes a first plate flange and a first plate body that defines the first slot, and the first plate body recessed relative to the first plate flange. The third plate includes a third plate flange and a third plate body that defines the second slot, the third plate body is recessed relative to the third plate flange and the second plate is sandwiched between the first plate body and the third plate body. The second plate is movable relative to the first plate and the third plate.

DESCRIPTION OF THE DRAWINGS

The exemplary embodiments will hereinafter be described in conjunction with the following drawing figures, wherein like numerals denote like elements, and wherein:

FIG. 9 is a perspective view of another exemplary engine bracket for use with the mount of FIG. 1 in accordance with various embodiments;

FIG. 10 is a side view of the engine bracket of FIG. 9;

FIG. 11 is a perspective view of another exemplary vehicle bracket for use with the mount of FIG. 1 in accordance with various embodiments;

FIG. 12 is another perspective view of the vehicle bracket of FIG. 11;

DETAILED DESCRIPTION

Figure 1:
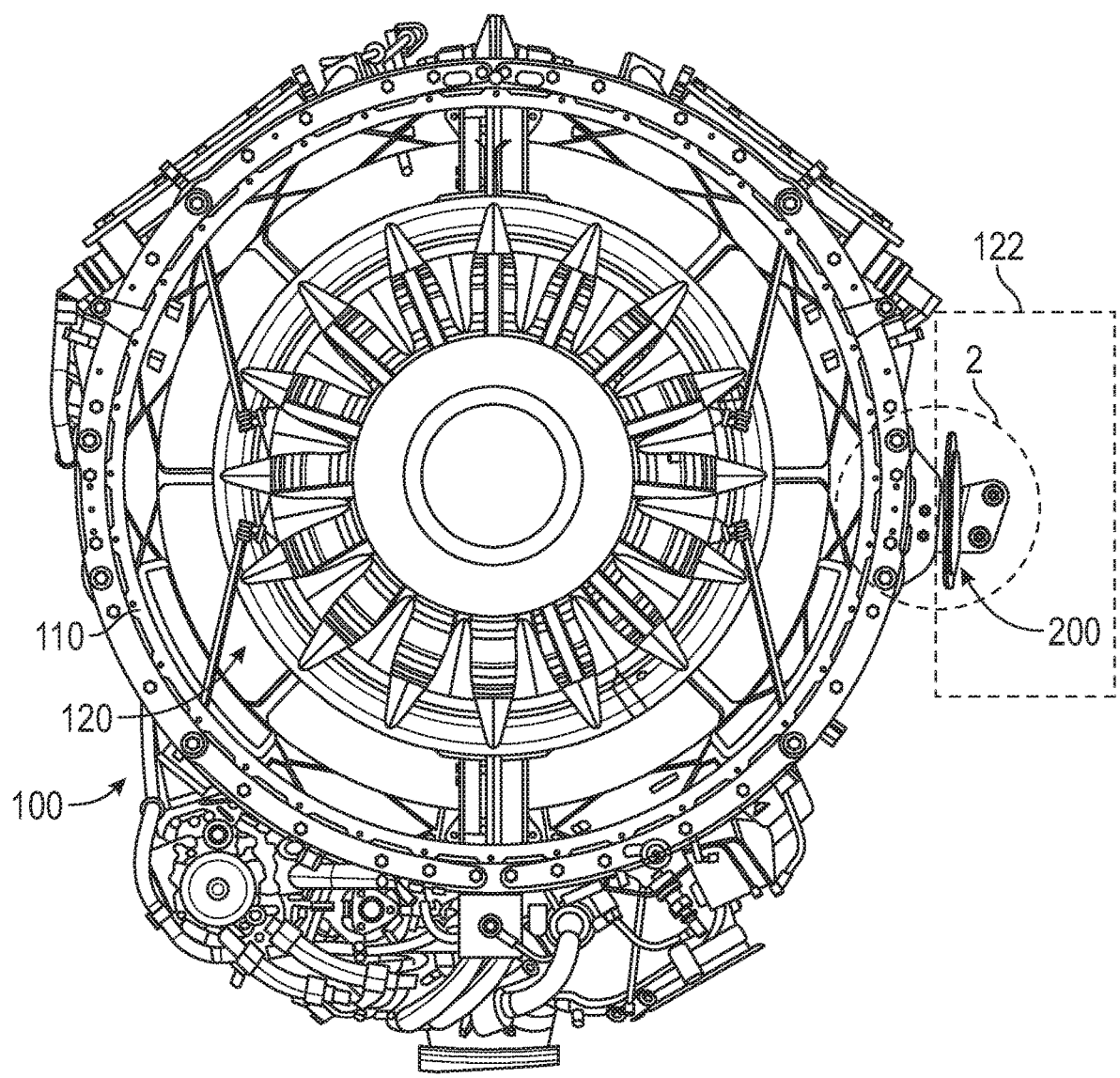
FIG. 1 is a schematic cross-sectional illustration of a gas turbine engine, which includes a mount for coupling the gas turbine engine to a vehicle structure of a vehicle in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from having a mount that compensates for axial and angular misalignment, and the gas turbine engine described herein is merely one exemplary embodiment according to the present disclosure. In addition, while the mount and the seal are each described herein as being used with a gas turbine engine used for propulsion or power generation onboard a vehicle, such as a bus, motorcycle, train, motor vehicle, marine vessel, aircraft, rotorcraft and the like, the various teachings of the present disclosure can be used with a gas turbine engine on a stationary platform or for stationary power generation. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

FIG. 1 is a simplified, cross-sectional view of a gas turbine engine 100 according to an exemplary embodiment. The gas turbine engine 100 may be disposed in an engine case or an outer bypass duct 110 and may include a fan section, a compressor section, a combustor section, a turbine section, and an exhaust section 120. As will be discussed, the gas turbine engine 100 includes at least one mount 200, which couples the gas turbine engine 100 to a vehicle 122 while allowing for axial and angular misalignment between the gas turbine engine 100 and the vehicle 122. In one example, the mount 200 is coupled to the outer bypass duct 110 and is coupled to a vehicle structure 124 of the vehicle 122, for example, a pylon. The mount 200 enables the quick removal of the gas turbine engine 100, without requiring removal of any surrounding structure of the vehicle 122 and/or the gas turbine engine 100, such as a casing surrounding the pylon, the outer bypass duct 110, etc., to access the mount 200. Thus, the mount 200 simplifies the installation of the gas turbine engine 100, while also enabling easier removal and replacement of the gas turbine engine 100, if needed, for maintenance for example.

With continued reference to FIG. 1, as the gas turbine engine 100 may comprise any suitable gas turbine engine or propulsion engine for use with the vehicle 122, the gas turbine engine 100 will not be discussed in great detail herein. Briefly, in one example, the gas turbine engine 100 includes the fan section having a fan, which draws in and accelerates at least a portion of the air into the compressor section. The compressor section may include a series of compressors that raise the pressure of the air directed from the fan. The compressors then direct the compressed air into the combustor section. In the combustor section, the high pressure air is mixed with fuel and combusted. The combusted air is then directed into the turbine section.

The turbine section may include a series of turbines, which may be disposed in axial flow series. The combusted air from the combustor section expands through and rotates the turbines prior to being exhausted through the exhaust section 120. In one embodiment, the turbines rotate to drive equipment in the gas turbine engine 100 via concentrically disposed shafts or spools. In one example, the turbines may drive the compressors via one or more rotors. As discussed, the exemplary embodiments discussed herein are not limited to use in conjunction with a particular type of turbine engine.

Figure 2:
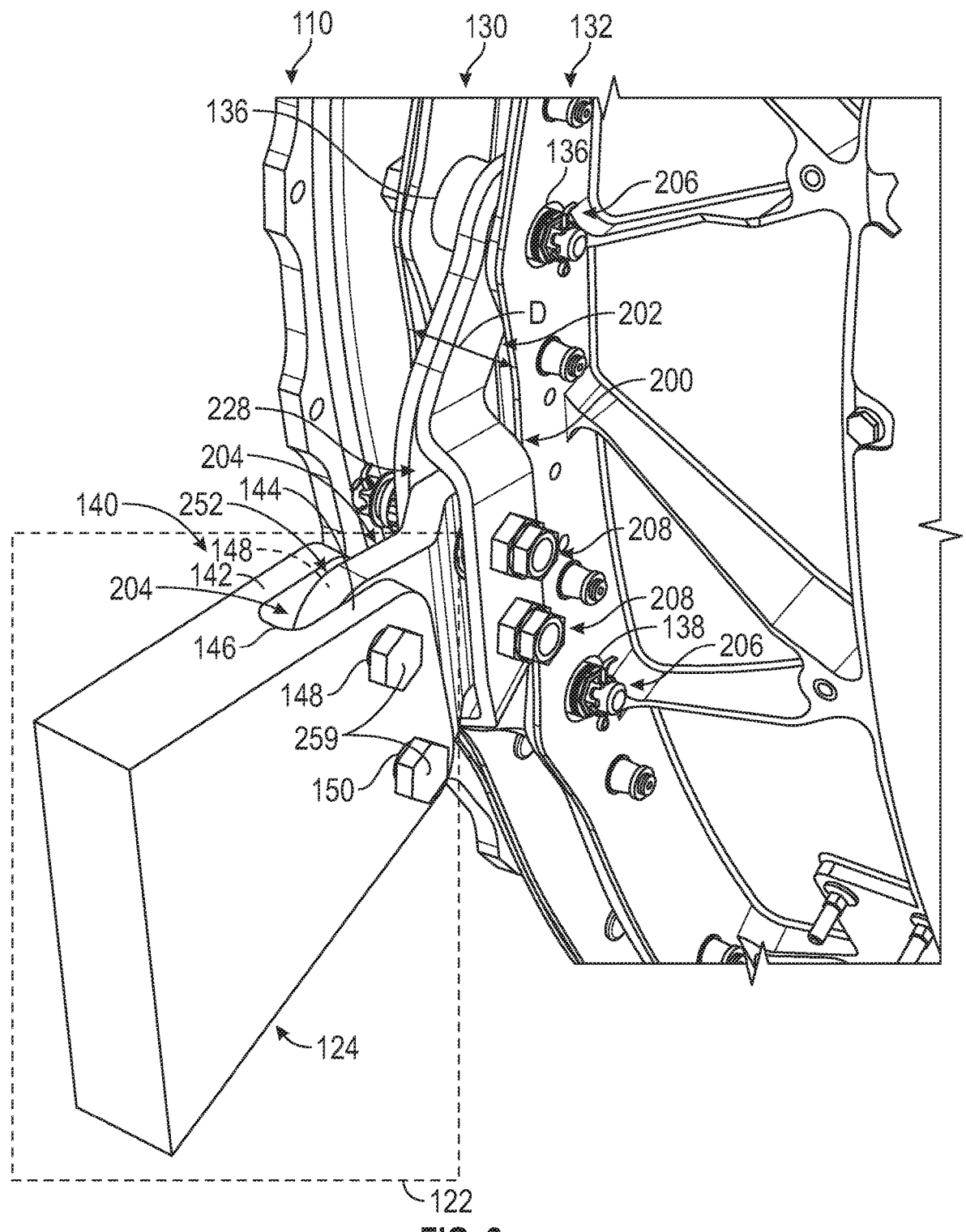
FIG. 2 is a detail perspective view, taken as a rear view at 2 of FIG. 1, which illustrates the mount coupled to the gas turbine engine and the vehicle structure, in accordance with various embodiments.

The mount 200 is generally an aft mount, which is mounted towards a tail or rear of the gas turbine engine 100 for supporting the rear of the gas turbine engine 100 on a side of the vehicle 122. With reference to FIG. 2, FIG. 2 is a detail view of the coupling of the gas turbine engine 100 to the vehicle 122 with the mount 200. In one example, the mount 200 is coupled between the outer bypass duct 110 and the vehicle structure 124. Generally, the outer bypass duct 110 includes a first mounting flange 130 that is spaced apart from a second mounting flange 132. The first mounting flange 130 and the second mounting flange 132 may extend about a perimeter or circumference of the outer bypass duct 110. In one example, the first mounting flange 130 and the second mounting flange 132 are coupled to the outer bypass duct 110 via welding, mechanical fasteners, etc.; however, the first mounting flange 130 and the second mounting flange 132 may be integrally formed with the outer bypass duct 110 if desired. The first mounting flange 130 is spaced apart from the second mounting flange 132 by a distance D. The distance D is sized to enable a portion of the mount 200 to be positioned between the first mounting flange 130 and the second mounting flange 132. The first mounting flange 130 and the second mounting flange 132 are shown with a double wall construction, however, the first mounting flange 130 and the second mounting flange 132 may have a single wall with increased thickness, if desired.

Figure 3:
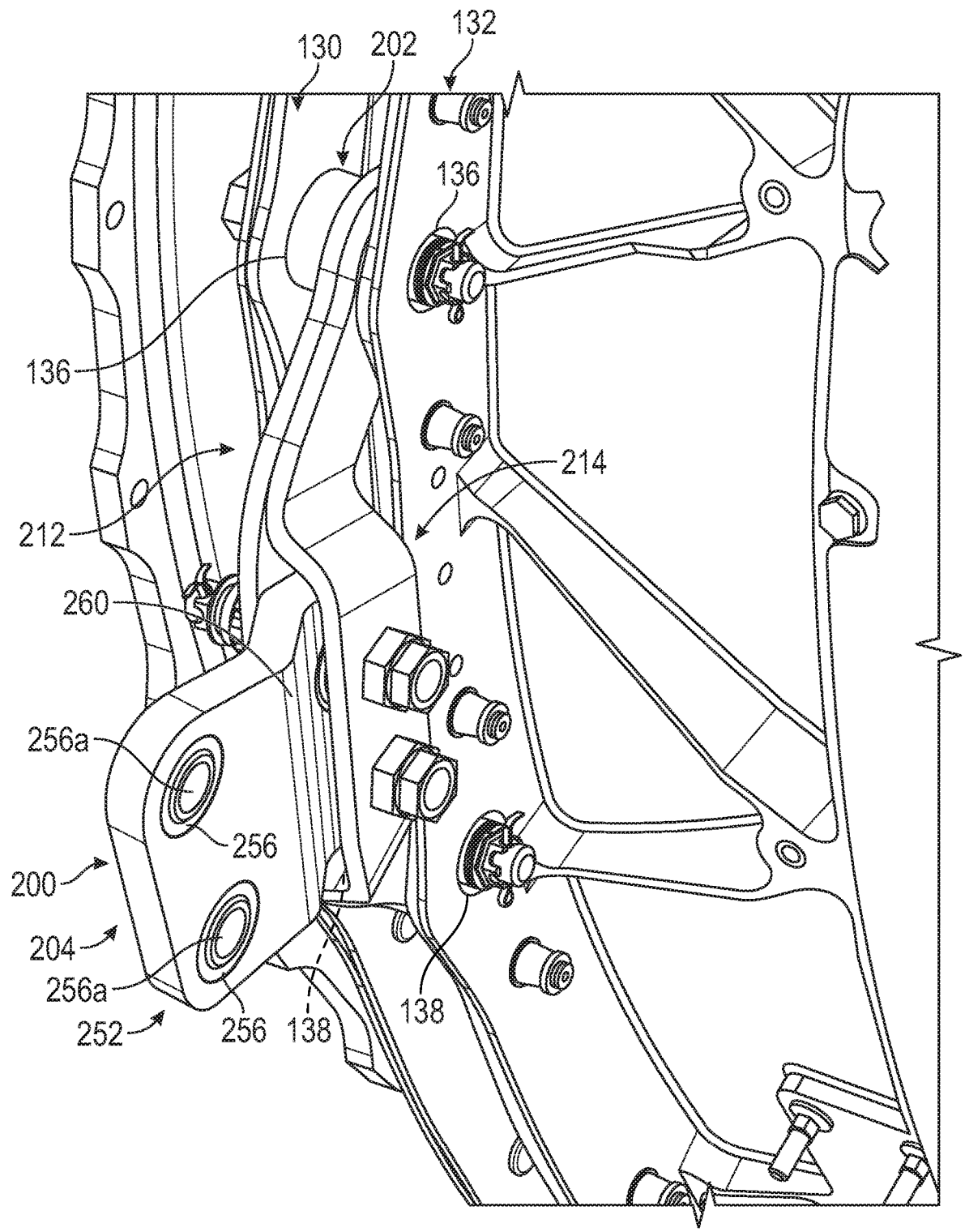
FIG. 3 is a detail perspective view, taken as a rear view at 2 of FIG. 1, which illustrates the mount coupled to the gas turbine engine with the vehicle structure removed for clarity, in accordance with various embodiments.
Figure 3A:
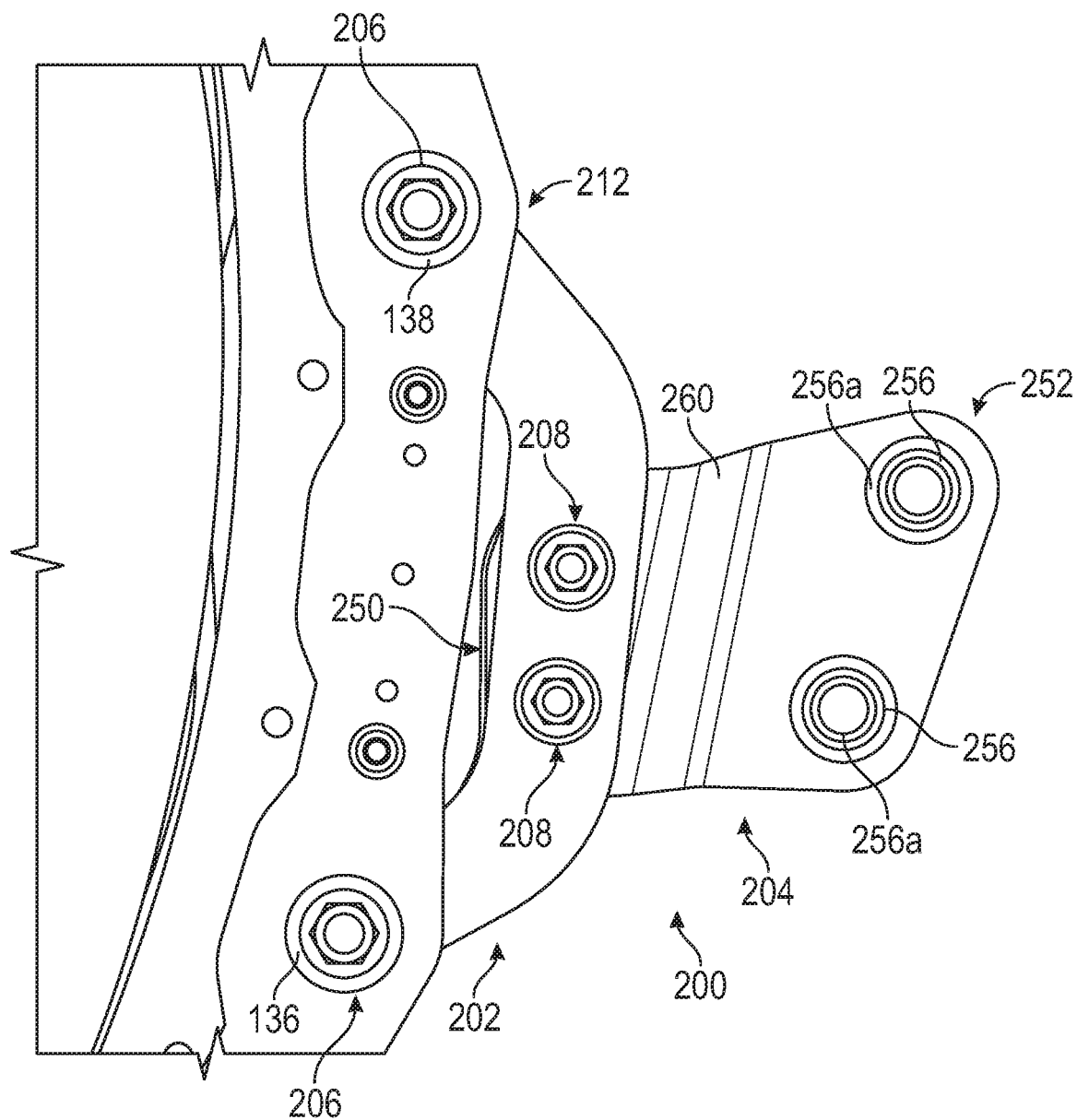
FIG. 3A is a detail perspective view, taken from as a front view at 2 of FIG. 1, which illustrates the mount coupled to the gas turbine engine with the vehicle structure removed for clarity, in accordance with various embodiments

With reference to FIG. 3, a detail view of the mount 200 coupled to the outer bypass duct 110 is shown, with the vehicle 122 and the vehicle structure 124 removed for clarity. Each of the first mounting flange 130 and the second mounting flange 132 include at least one or in this example, two openings 136, 138. The openings 136 are spaced apart from the openings 138 about the perimeter or circumference of the first mounting flange 130 and the second mounting flange 132. The openings 136, 138 are defined through the first mounting flange 130 and the second mounting flange 132 for coupling the mount 200 to the first mounting flange 130 and the second mounting flange 132, as will be discussed further herein.

With reference back to FIG. 2, in one example, the vehicle structure 124 includes a generally U-shaped flange 140. The flange 140 includes a first flange member 142 spaced apart from a second flange member 144 to define a receptacle 146 for receiving a portion of the mount 200. Each of the first flange member 142 and the second flange member 144 define at least one and in this example, two openings 148, 150. Generally, the openings 148, 150 are spaced apart from each other along the first flange member 142 and the second flange member 144. The openings 148, 150 are defined through the flange 140 for coupling the flange 140 to the mount 200, as will be discussed further herein.

Figure 4:
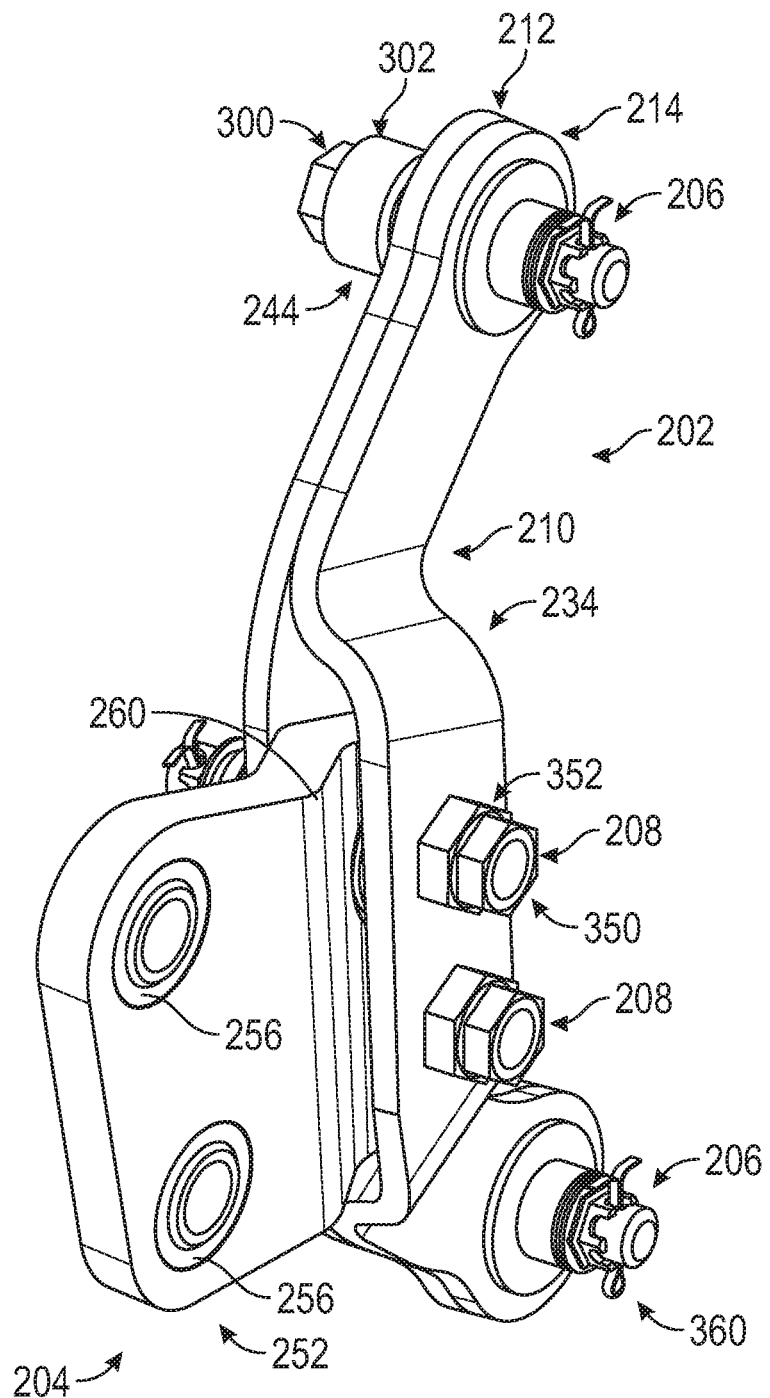
FIG. 4 is a detail perspective view of the mount of FIG. 1, in accordance with various embodiments.

With reference to FIG. 4, the mount 200 is shown in detail. As discussed, the mount 200 couples the gas turbine engine 100 to the vehicle 122. In one example, the mount 200 includes an engine bracket 202, a vehicle bracket 204, a pair of first fastener assemblies 206 and a pair of second fastener assemblies 208. The engine bracket 202 is coupled to the vehicle bracket 204. The engine bracket 202 couples the mount 200 to the gas turbine engine 100, and the vehicle bracket 204 couples the mount 200 to the vehicle structure 124 of the vehicle 122. The engine bracket 202 and the vehicle bracket 204 are composed of a metal or metal alloy, including, but not limited to titanium, Inconel 718, Inconel 675, etc.; and may be cast, forged, stamped or formed through additive manufacturing.

Figure 5:
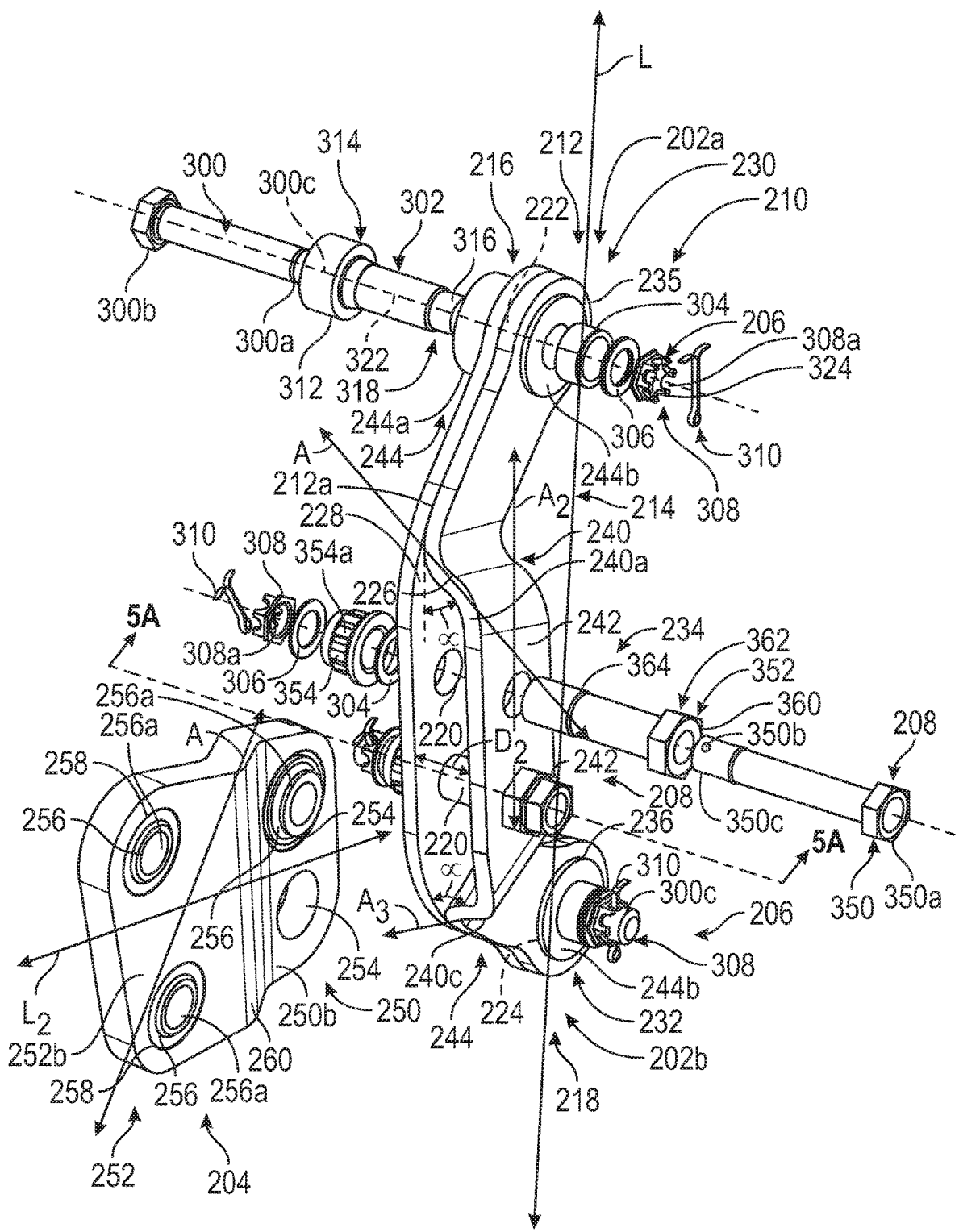
FIG. 5 is a partially exploded view of the mount of FIG. 4.

The engine bracket 202 includes a body 210. In this example, the body 210 includes a first member 212 and a second member 214. The first member 212 and the second member 214 provide for a damage tolerant engine bracket, as an issue with one of the first member 212 does not propagate to the second member 214, and vice versa. This ensures that a connection remains between the gas turbine engine 100 and the vehicle 122. The first member 212 and the second member 214 may configured as a split clevis. The first member 212 is fixedly coupled to the second member 214, via welding, for example. With reference to FIG. 5, an exploded view of the mount 200 is shown. The first member 212 is generally flat or planar. The first member 212 of the body 210 includes a first end 216 opposite a second end 218 and defines bracket coupling bores 220 between the first end 216 and the second end 218. The first end 216 may be offset from the second end 218 such that the first member 212 may be curved or arcuate to conform with the curvature of the outer bypass duct 110. The first end 216 defines a bore 222, and the second end 218 defines a bore 224. The bores 222, 224 each receive a portion of the first fastener assemblies 206 for coupling the engine bracket 202 to the outer bypass duct 110.

Generally, the first member 212 is directly coupled to the second member 214 at the first end 216 and the second end 218, but is spaced apart from the second member 214 at an intermediate portion 226 to cooperate with the second member 214 to define a receptacle 228. The bracket coupling bores 220 are defined through the first member 212 at the intermediate portion 226. The bracket coupling bores 220 are spaced apart from each other at the intermediate portion 226 to receive the pair of second fastener assemblies 208 to couple the vehicle bracket 204 to the engine bracket 202. Thus, the intermediate portion 226 is a portion of the first member 212 that is spaced apart from the second member 214 to define the receptacle 228. Generally, the first member 212 is spaced apart from the second member 214 by a second distance D2, which is sized to enable the vehicle bracket 204 to be received within the receptacle 228.

The second member 214 includes a first end 230 opposite a second end 232 and defines an offset coupling portion 234 between the first end 230 and the second end 232. The first ends 216, 230 of the first member 212 and the second member 214, respectively, define a first end 202a for the body 210; and the second ends 218, 232 of the first member 212 and the second member 214, respectively, define a second end 202b for the body 210. The first end 230 may be offset from the second end 232 such that the second member 214 may be curved or arcuate to conform with the curvature of the outer bypass duct 110. The first end 230 defines a bore 235, and the second end 232 defines a bore 236. The bores 235, 236 each receive a portion of the first fastener assemblies 206 for coupling the engine bracket 202 to the outer bypass duct 110.

The offset coupling portion 234 is spaced apart from the first member 212 by the distance D2. The offset coupling portion 234 opposes the intermediate portion 226 of the first member 212. The offset coupling portion 234 protrudes outwardly from the second member 214 between the first end 230 and the second end 232 to define the receptacle 228. The offset coupling portion 234 may be substantially C-shaped, and may be defined by a plurality of segments 240. A first segment 240a is adjacent to the first member 212 near or at the first end 216, and extends along an axis A, which is substantially transverse or oblique to a longitudinal axis L of the engine bracket 202. A second segment 240b extends from the first segment 240a to a third segment 240c. The second segment 240b is substantially planar, and extends along an axis A2, which is substantially parallel to the longitudinal axis L, and transverse or oblique to the axis A. The second segment 240b defines at least one and in this example, two bracket coupling bores 242. The bracket coupling bores 242 are spaced apart along the second segment 240b and each receives a portion of a respective one of the pair of second fastener assemblies 208 for coupling the vehicle bracket 204 to the engine bracket 202. A third segment 240c extends from the second segment 240b to be adjacent to the first member 212 near or at the second end 218. The third segment 240c extends at an angle or along an axis A3, which is substantially transverse or oblique to the longitudinal axis L of the engine bracket 202.

In one example, the first segment 240a and the third segment 240c each extend at an angle α relative to a surface 212a of the first member 212. In one example, the angle α is about 25 degrees to about 80 degrees. It should be noted that the angle α may be variable to account for vehicle structures associated with different vehicles. In this regard, the first segment 240a and the third segment 240c enable the mount 200 to be coupled to the vehicle 122 in instances where the vehicle 122 is angularly misaligned with the gas turbine engine 100. Depending upon the vehicle structure 124, the first segment 240a and the third segment 240c may be angled at the angle α for a predefined amount to enable coupling of the mount 200 to the vehicle structure 124. Thus, the mount 200 may be employed to couple the gas turbine engine 100 to the vehicle structure 124 in instances where the vehicle structure 124 and the gas turbine engine 100 are angularly misaligned by compensating for the misalignment with the vehicle bracket 204.

Figure 5A:
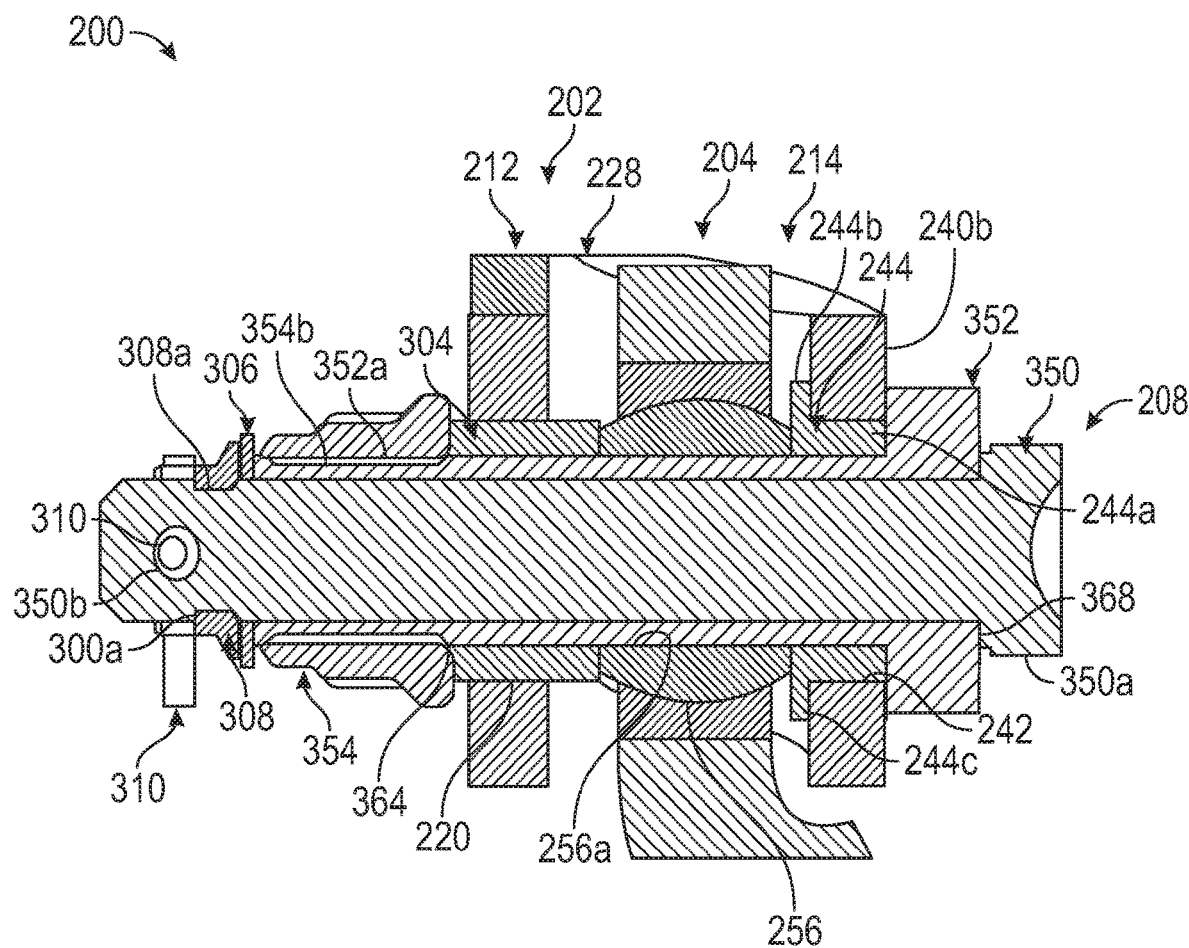
FIG. 5A is a cross-sectional view of one of a pair of second fastener assemblies, taken along line 5A-5A of FIG. 5.

In certain instances, the bores 222, 235, the bracket coupling bores 220, 242 and the bores 224, 236 of the respective first member 212 and the second member 214 may include a respective bushing 244. With reference to FIG. 5A, the bushing 244 may include a first end 244a that extends outwardly from the bores 222, 224 to receive a portion of a respective one of the pair of first fastener assemblies 206 or one of the pair of second fastener assemblies 208. The bushing 244 may include an opposite second end 244b, which is contained within the second member 214 by a flange 244c. The bushing 244 assists in transferring forces between the pair of first fastener assemblies 206 and the mount 200; and the pair of second fastener assemblies 208 and the mount 200.

With reference back to FIG. 5, the vehicle bracket 204 is received within the receptacle 228, and thus, is received between the first member 212 and the second member 214. The vehicle bracket 204 includes a first bracket end 250 opposite a second bracket end 252. The first bracket end 250 is offset from the second bracket end 252 to enable axial misalignment between the gas turbine engine 100 and the vehicle structure 124 (FIG. 2). The first bracket end 250 includes at least one, and in this example, two vehicle bracket coupling bores 254. The vehicle bracket coupling bores 254 receive a portion of a respective one of the pair of second fastener assemblies 208 to couple the vehicle bracket 204 to the engine bracket 202. In one example, at least one of the vehicle bracket coupling bores 254 include a spherical bearing 256. It should be noted that while one of the vehicle bracket coupling bores 254 is shown with the spherical bearing 256, each of the vehicle bracket coupling bores 254 may receive the spherical bearing 256. The spherical bearing 256 is any suitable spherical bearing, which enables an angular rotation of the respective one of the pair of second fastener assemblies 208 in two orthogonal directions. The spherical bearings 256 allow for a thermal expansion of the gas turbine engine 100. In addition, the spherical bearings 256 enable a varying amount of misalignment between the vehicle bracket 204 and the vehicle structure 124, and also compensate for assembly tolerances. In one example, the spherical bearing 256 is swaged into the respective vehicle bracket coupling bore(s) 254 to retain the spherical bearing 256 within the respective vehicle bracket coupling bore(s) 254. Each spherical bearing 256 includes a throughbore 256a, which enables the receipt of a fastener, such as a portion of one of the first fastener assemblies 206 or one of the second fastener assemblies 208 to be received therethrough.

The second bracket end 252 includes at least one, and in this example, two vehicle coupling bores 258. The vehicle coupling bores 258 receive a portion of a respective one of a pair of vehicle fasteners 259 (FIG. 2) to couple the vehicle bracket 204 to the vehicle structure 124 (FIG. 2). In one example, each of the vehicle coupling bores 258 include the spherical bearing 256. In one example, the spherical bearing 256 is swaged into the respective vehicle coupling bores 258 to retain the spherical bearing 256 within the respective vehicle coupling bores 258. In certain instances, the spherical bearings 256 of the vehicle bracket 204 may have different sizes depending upon the configuration of the vehicle bracket 204. It should also be noted that although not shown herein, the engine bracket 202 may include one or more spherical bearings 256. Generally, the mount 200 includes a total of at least three spherical bearings 256, which may be coupled to the vehicle bracket 204, the engine bracket 202 or a combination of vehicle bracket 204 and the engine bracket 202.

Figure 6:
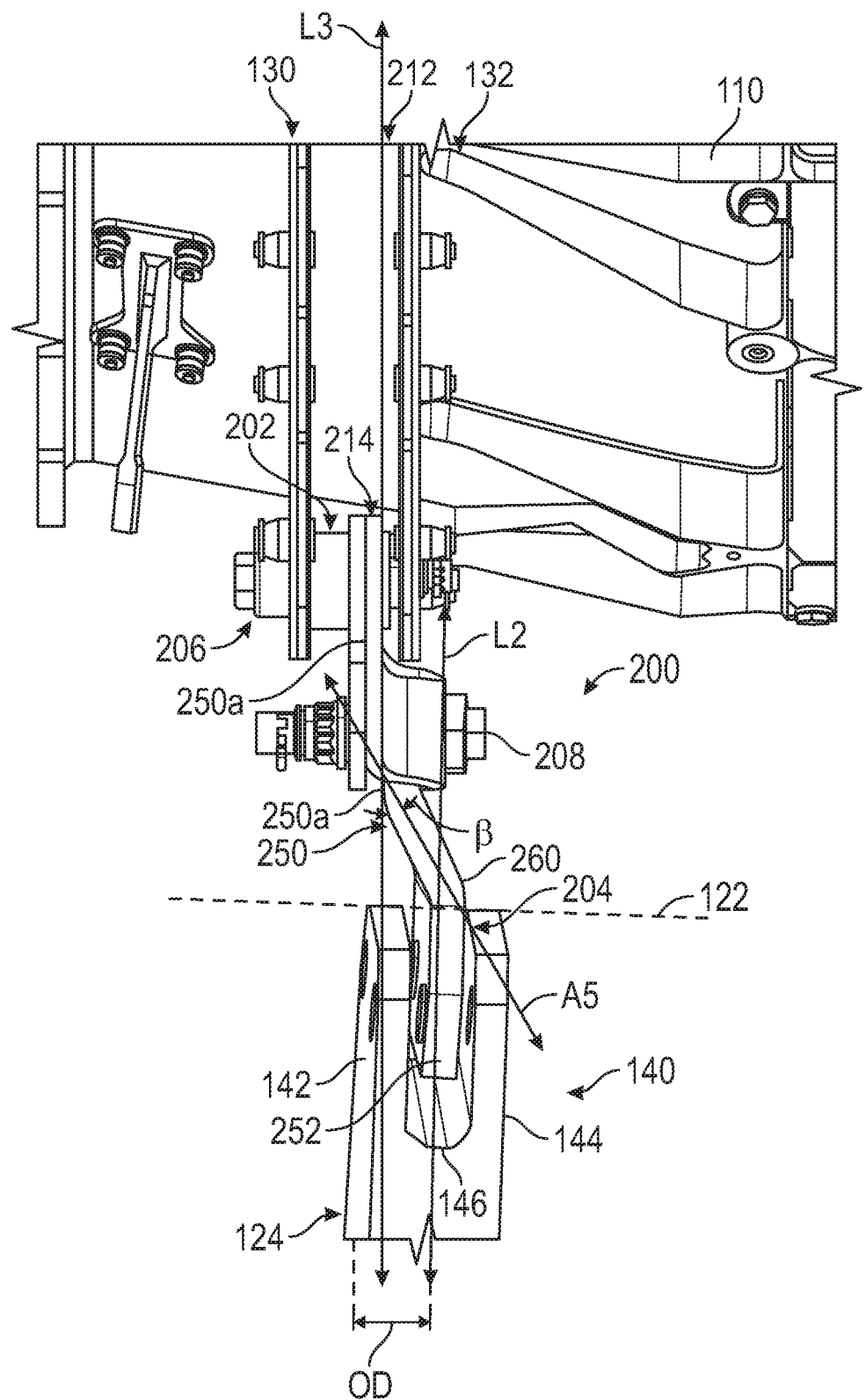
FIG. 6 is a side view of the mount coupled to the gas turbine engine and the vehicle structure, which illustrates an offset dimension provided by the mount, in accordance with various embodiments.

In one example, an intermediate bracket segment 260 interconnects the first bracket end 250 and the second bracket end 252. Generally, a surface 250b of the first bracket end 250 is offset from a surface 252b of the second bracket end 252 by the intermediate bracket segment 260. The surface 250b comprises a mount plane for the gas turbine engine 100, and the surface 252b defines a mount plane for the vehicle 122, and the offset between these surfaces 250b, 252b, which are interconnected by the intermediate bracket segment 260, results in or enables an offset between the gas turbine engine 100 and the vehicle 122. With reference to FIG. 6, the intermediate bracket segment 260 extends along an axis A5, which is transverse or oblique to a longitudinal axis L2 of the vehicle bracket 204. Thus, the first bracket end 250 is offset from the second bracket end 252 along the longitudinal axis L2. In one example, the intermediate bracket segment 260 extends at an angle β relative to a surface 250a of the first bracket end 250. In one example, the angle β is about 10 degrees to about 30 degrees based on the predetermined amount of offset desired. It should be noted that the angle β may be variable to account for vehicle structures associated with different vehicles.

The intermediate bracket segment 260 enables the mount 200 to be coupled to the vehicle 122 in instances where the vehicle 122 is axially misaligned with the gas turbine engine 100. Depending upon the vehicle structure 124, the intermediate bracket segment 260 may be angled at the angle β for a predefined amount to enable coupling of the mount 200 to the vehicle structure 124. Thus, the mount 200 may be employed to couple the gas turbine engine 100 to the vehicle structure 124 in instances where the vehicle structure 124 and the gas turbine engine 100 are axially misaligned by compensating for the misalignment with the vehicle bracket 204. In one example, the mount 200 enables the gas turbine engine 100 to be axially offset from the vehicle structure 124 by an offset dimension OD. In one example, the offset dimension OD is about 1.0 inches (in.). It should be noted that based on the angle β of the intermediate bracket segment 260, the offset dimension OD may be greater than or less than 1.0 inches (in.), for example from about 0.0 inches (in.) to about 1.5 inches (in.).

With reference back to FIG. 5, the pair of first fastener assemblies 206 couple the engine bracket 202 to the outer bypass duct 110. As each of the first fastener assemblies 206 is the same, a single one of the fastener assemblies will be described herein. In one example, the first fastener assembly 206 includes a bolt 300, a sleeve 302, a spacer 304, a washer 306, a nut 308 and a pin 310. The bolt 300 extends through the opening 136 or 138 of the first mounting flange 130, the sleeve 302, the bores 222, 235 of the engine bracket 202 and opening 136 or 138 of the second mounting flange 132 (FIG. 3). The bolt 300 is any suitable bolt, and may include a plurality of threads 300a for matingly engaging with a plurality of threads 308a of the nut 308. The bolt 300 also includes a head 300b, and a pin hole 300c defined opposite the head 300b. The pin hole 300c is defined transverse to a longitudinal axis of the bolt 300 and receives the pin 310.

The sleeve 302 extends through the opening 136 of the first mounting flange 130, the sleeve 302, the bores 222, 235 of the engine bracket 202 and opening 136 of the second mounting flange 132 (FIG. 3) and receives the bolt 300. The sleeve 302 includes a flange 312 at a first end 314, and a reduced wall thickness 316 at an opposite second end 318. The flange 312 contacts the head 300b of the bolt 300 when the bolt 300 is coupled to the sleeve 302. The reduced wall thickness 316 enables a portion of the spacer 304 and the washer 306 to be received over the sleeve 302 to assist in coupling the nut 308 to the bolt 300. The sleeve 302 includes a central bore 320, which may be concentric with a central axis of each of the bores 222, 235; 224, 236 (FIG. 3). In other embodiments, the central bore 320 may be eccentric with the central axis of each of the bores 222, 235; 224, 236 (FIG. 3).

The spacer 304 is annular, and is received onto the reduced wall thickness 316 of the sleeve 302. The washer 306 is also annular, and may be thinner than the spacer 304. The washer 306 is also received onto the reduced wall thickness 316 of the sleeve 302. The nut 308 is annular, and includes the plurality of threads 308a defined on an inner diameter. The nut 308 is coupled to the bolt 300, and retains the sleeve 302 about the bolt 300. By providing the bolt 300 within the sleeve 302, which is retained by the nut 308, the bolt 300 and the sleeve 302 cooperate to form a failsafe fastener, such that in the event of an issue with the sleeve 302, the bolt 300 remains intact. Thus, in this example, the bolt 300 is installed in double shear. The nut 308 also includes a plurality of slots 324 such that the nut 308, in one example, is a castellated nut. The plurality of slots 324 enable the pin 310 to be received through the pin hole 300c of the bolt 300 and prevent a retraction of the bolt 300. In one example, the pin 310 is a cotter pin. The pin 310 is received through the pin hole 300c to further assist in retaining the bolt 300 within the sleeve 302. The pin 310 cooperates with the nut 308 to retain the bolt 300, and thus, retain the engine bracket 202 coupled to the outer bypass duct 110.

The pair of second fastener assemblies 208 couple the vehicle bracket 204 to the engine bracket 202. As each of the second fastener assemblies 208 is the same, a single one of the second fastener assemblies 208 will be described herein. In addition, as certain components of the first fastener assembly 206 are the same as certain components of the second fastener assembly 208, the same reference numerals will be used to denote the same components. In one example, the second fastener assembly 208 includes a bolt 350, a sleeve bolt 352, a nut 354, the spacer 304, the washer 306, the nut 308 and the pin 310. The bolt 350 extends through the bracket coupling bore 242 of the second member 214, the throughbore 256a of the spherical bearing 256 of the vehicle bracket 204 and the bracket coupling bore 220 of the first member 212 (FIG. 5A). The bolt 350 also extends through the sleeve bolt 352. The bolt 350 is any suitable bolt, and may include a head 350a and a pin hole 350b defined opposite the head 350a. The pin hole 350b is defined transverse to a longitudinal axis of the bolt 350 and receives the pin 310. The bolt 350 may also define the plurality of threads 350c, which matingly engage with the plurality of threads 308a of the nut 308.

The sleeve bolt 352 extends through the bracket coupling bore 242 of the second member 214, the throughbore 256a of the spherical bearing 256 of the vehicle bracket 204 and the bracket coupling bore 220 of the first member 212. The sleeve bolt 352 includes a head 360 at a first end 362, and a reduced wall thickness 364 at an opposite second end 366. The head 360 contacts the head 350a of the bolt 350 when the bolt 350 is coupled to the sleeve bolt 352. The reduced wall thickness 364 enables a portion of the spacer 304 and the nut 354 to be received over the sleeve bolt 352 to assist in coupling the nut 308 to the bolt 350. The reduced wall thickness 364 defines a plurality of threads 352a, which matingly engage with a plurality of threads 354b of the nut 354 (FIG. 5A). The sleeve bolt 352 includes a central bore 368 (FIG. 5A), which may be concentric with a central axis of each of the bracket coupling bores 220, 242. In other embodiments, the central bore 320 may be eccentric with the central axis of each of the bracket coupling bores 220, 242 (FIG. 3). The nut 354 is annular, and is received onto the reduced wall thickness 316 of the sleeve 302. The nut 354 may include a gripping feature 354a, which enables a tool or instrument to hold the nut 354 to assist in the coupling or uncoupling of the vehicle bracket 204 from the engine bracket 202.

The spacer 304 is annular, and is received onto the reduced wall thickness 316 of the sleeve 302. The washer 306 is also received onto the reduced wall thickness 316 of the sleeve 302. The nut 308 is annular, and includes the plurality of threads 308a defined on an inner diameter. The nut 308 is coupled to the bolt 350, and retains the sleeve bolt 352 about the bolt 350. By providing the bolt 350 within the sleeve bolt 352, which is retained by the nut 308, the bolt 350 and the sleeve bolt 352 cooperate to form a failsafe fastener, such that in the event of an issue with the sleeve bolt 352, the bolt 350 remains intact. Thus, in this example, the bolt 350 is installed in double shear. The plurality of slots 322 of the nut 308 enable the pin 310 to be received through the pin hole 350b of the bolt 350 and prevent a retraction of the bolt 350. The pin 310 is received through the pin hole 350b to further assist in retaining the bolt 350 within the sleeve bolt 352. The pin 310 cooperates with the nut 308 to retain the bolt 350, and thus, retain the vehicle bracket 204 coupled to engine bracket 202. Generally, only one of the second fastener assemblies 208 is loaded in use, such that in the event of an issue, the other one of the second fastener assemblies 208 may receive the load.

In one example, in order to couple the gas turbine engine 100 to the vehicle 122, the mount 200 is formed and assembled. With the first member 212 and the second member 214 formed, the first member 212 is fixedly coupled to the second member 214, via welding, for example, to define the receptacle 228. Generally, the second member 214 is formed with the predefined angle α for the offset coupling portion 234 that corresponds with the vehicle structure 124. The vehicle bracket 204 is formed with the predefined angle β for the predefined axial offset between the gas turbine engine 100 and the vehicle structure 124. With reference to FIG. 3, one or more spherical bearings 256 may be coupled to the vehicle bracket coupling bores 254.

Figure 7A:
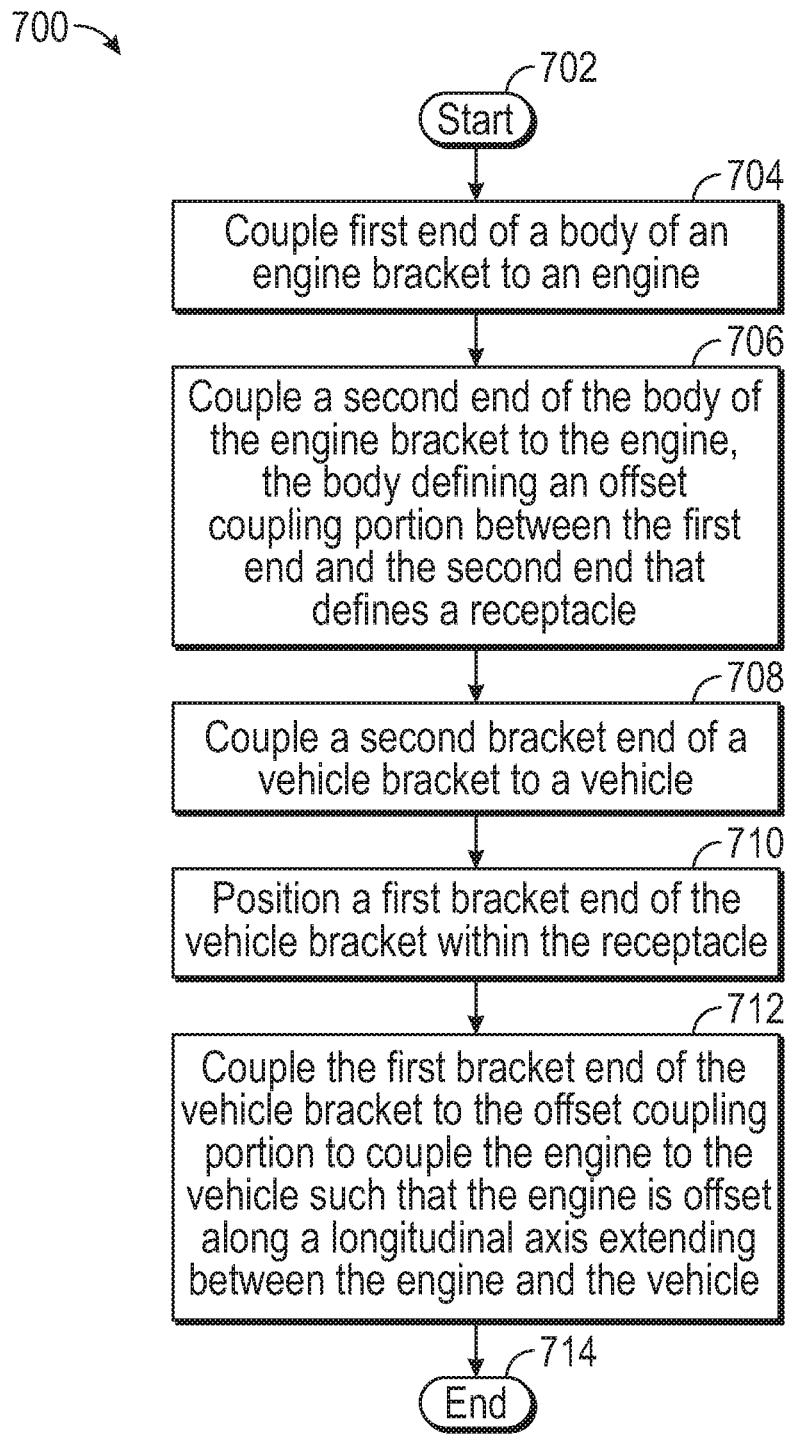
FIG. 7A is a flow chart illustrating an exemplary method for coupling the gas turbine engine to the vehicle with the mount, in accordance with various embodiments.

In one example, with continued reference to FIGS. 2 and 5, and with additional reference to FIG. 7A, a method 700 for coupling the gas turbine engine 100 to the vehicle 122 is shown. As can be appreciated in light of the disclosure, the order of operation within the method is not limited to the sequential execution as illustrated in FIG. 7A, but may be performed in one or more varying orders as applicable and in accordance with the present disclosure. The method begins at 702, with the engine bracket 202 and the vehicle bracket 204 formed as discussed above.

At 704, with the vehicle bracket 204 coupled to the engine bracket 202, the first end 202a of the body 210 of the engine bracket 202 is coupled to the outer bypass duct 110. Generally, one of the first fastener assemblies 206 is received through the opening 136 of the first mounting flange 130, through the bushing 244, through the bore 222, 235 of the engine bracket 202, and through the opening 136 of the second mounting flange 132. In one example, the sleeve 302 is inserted through the opening 136 of the first mounting flange 130, through the bushing 244, through the bore 222, 235 of the engine bracket 202, and through the opening 136 of the second mounting flange 132. The spacer 304 is received onto the reduced wall thickness 316 of the sleeve 302, and the washer 306 is received on the reduced wall thickness 316 of the sleeve 302 to be adjacent to the spacer 304. The bolt 300 is inserted through the sleeve 302, and threads 300a matingly engage with the threads 308a of the nut 308 until the pin hole 300c extends beyond the nut 308. The pin 310 is inserted through the pin hole 300c to couple the engine bracket 202 to the outer bypass duct. At 706, the second end 202b of the body 210 of the engine bracket 202 is coupled to the outer bypass duct 110, with the offset coupling portion 234 defined between the first end 202a and the second end 202b of the body 210 that defines the receptacle 228. Generally, the process discussed with regard to 704 is repeated to couple the other of the first fastener assemblies 206 to the opening 138 of the first mounting flange 130, through the bushing 244, through the bore 224, 236 of the engine bracket 202, and through the opening 138 of the second mounting flange 132.

With the engine bracket 202 coupled to the gas turbine engine 100, at 708, the vehicle bracket 204 is coupled to the vehicle structure 124. In one example, the second bracket end 252 of the vehicle bracket 204 is received within the flange 140 so that the vehicle coupling bores 258 and the throughbores 256a of the spherical bearings 256 are coaxially aligned with the openings 148, 150 in the flange 140. The vehicle fasteners 259 are inserted through the openings 148, 150 in the flange 140 and the throughbores 256a of the spherical bearings 256 to couple the vehicle structure 124 to the vehicle bracket 204. The vehicle fasteners 259 may comprise any suitable fastener, such as a bolt and nut, etc. At 710, the first bracket end 250 of the vehicle bracket 204 is positioned into the receptacle 228. At 712, the second fastener assemblies 208 are used to couple the vehicle bracket 204 to the engine bracket 202. In one example, with the vehicle bracket coupling bores 254 coaxially aligned with the bracket coupling bores 220, 242 of the engine bracket 202, the sleeve bolt 352 is inserted through the throughbore 256a and the bores 220, 242, 254. The nut 354 is assembled onto the end of the sleeve bolt 352 onto the reduced wall thickness 364. The washer 306 is positioned onto the end of the sleeve bolt 352 so as to be adjacent to the nut 354. The bolt 350 is inserted through the sleeve bolt 352, and threads 350c matingly engage with the threads 308a of the nut 308 until the pin hole 350b extends beyond the nut 308. The pin 310 is inserted through the pin hole 350b to couple the vehicle bracket 204 to the engine bracket 202. This process is repeated to couple the other of the second fastener assemblies 208 to the bores 220, 242, 254. Generally, with additional reference to FIG. 6, the mount 200 couples the gas turbine engine 100 to the vehicle 122 such that the gas turbine engine 100 is offset along a longitudinal axis L3 extending along the gas turbine engine 100 and the vehicle structure 124. The method ends at 714.

Figure 7B:
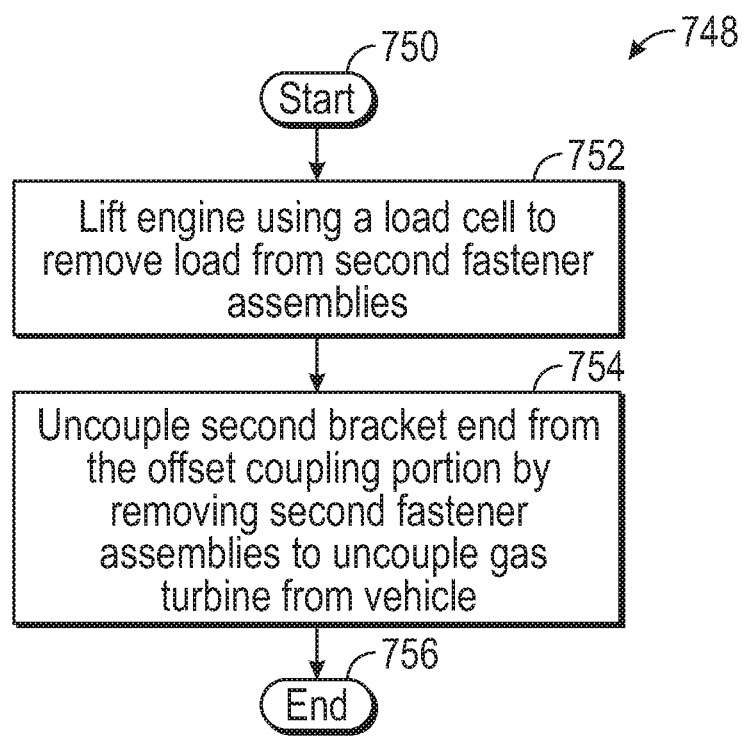
FIG. 7B is a flow chart illustrating an exemplary method for uncoupling the gas turbine engine from the vehicle with the mount, in accordance with various embodiments.

In one example, with additional reference to FIG. 7B, a method 748 for uncoupling the gas turbine engine 100 from the vehicle structure 124 is shown. As can be appreciated in light of the disclosure, the order of operation within the method is not limited to the sequential execution as illustrated in FIG. 7B, but may be performed in one or more varying orders as applicable and in accordance with the present disclosure.

The method begins at 750, with the gas turbine engine 100 coupled to the vehicle structure 124 via the mount 200. At 752, the gas turbine engine 100 is lifted, via a load cell, for example, to remove the load acting on the one of the second fastener assemblies 208. Generally, a single one of the second fastener assemblies 208 is loaded by the gas turbine engine 100. At 754, the second bracket end 252 of the vehicle bracket 204 is uncoupled from the offset coupling portion 234 by removing the second fastener assemblies 208, thereby uncoupling the gas turbine engine 100 from the vehicle 122. The method ends at 756.

Thus, the mount 200 enables the gas turbine engine 100 to be coupled to the vehicle 122 in instances where the gas turbine engine 100 and the vehicle 122 are misaligned. In this regard, by providing the offset coupling portion 234 at the angle α, the engine bracket 202 compensates for angular misalignment between the gas turbine engine 100 and the vehicle structure 124. Further, by providing the second bracket end 252 offset from the first bracket end 250 by the angle β, the vehicle bracket 204 compensates for axial misalignment between the gas turbine engine 100 and the vehicle structure 124. Moreover, the engine bracket 202 and the vehicle bracket 204 may be configured for a variety of gas turbine engines 100 and vehicle structure 124 by changing the respective angles α, β. In addition, the mount 200 enables the gas turbine engine 100 to be quickly and easily removed from the vehicle 122, by removing the second fastener assemblies 208 to uncouple the gas turbine engine 100 from the vehicle 122. In addition, the mount 200 reduces bending of the gas turbine engine 100, and inhibits deflection. The mount 200 also inhibits rubbing of the gas turbine engine 100 on the vehicle 122. In summary, the mount 200 allows for axial and angular misalignment (due to initial build and thermal expansion). Additionally, the mount 200 allows for quick assembly and disconnect.

Figure 8:
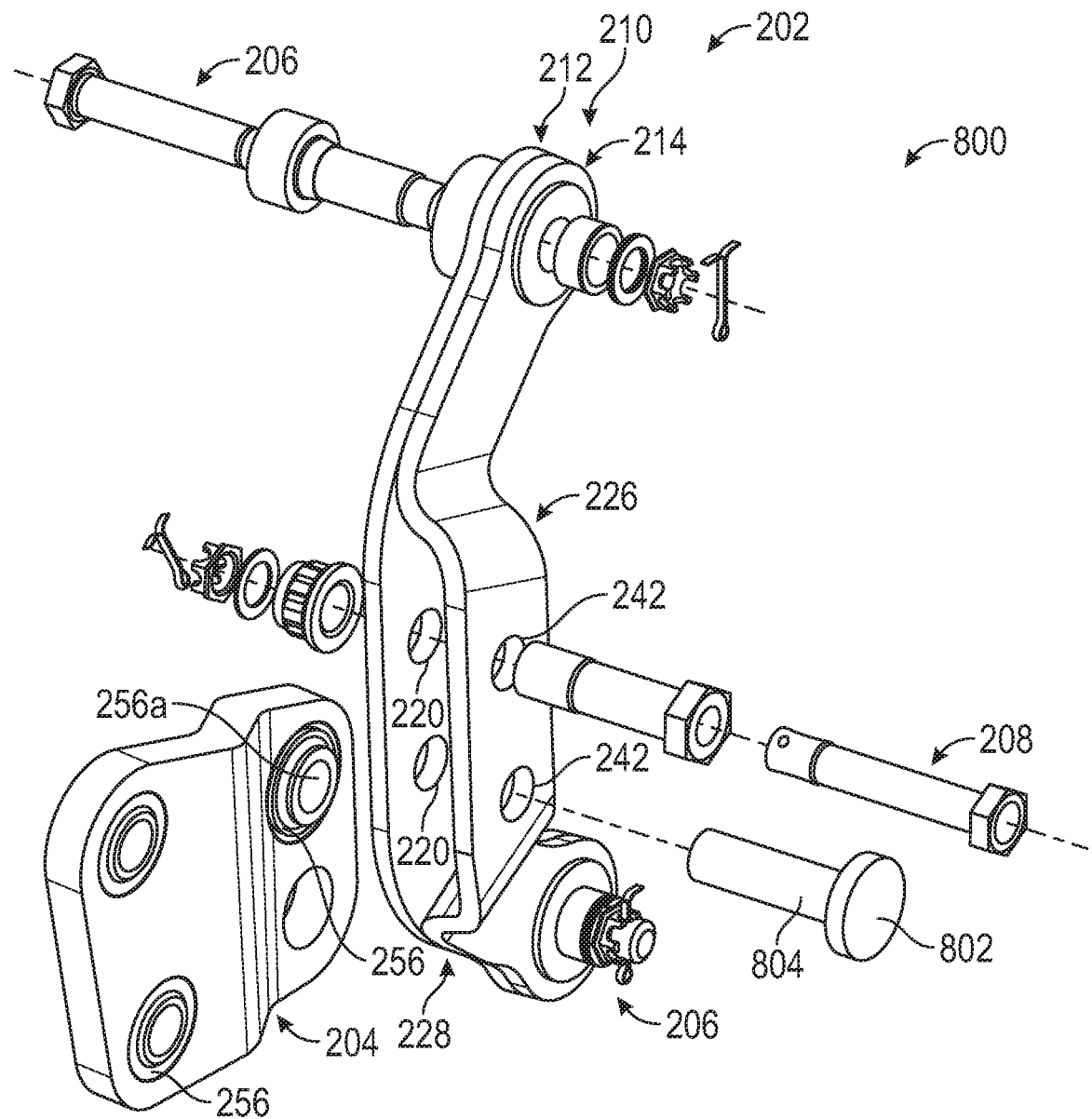
FIG. 8 is a partially exploded view of an exemplary mount for use in coupling the gas turbine engine to the vehicle structure of the vehicle, in accordance with various embodiments.
Figure 13:
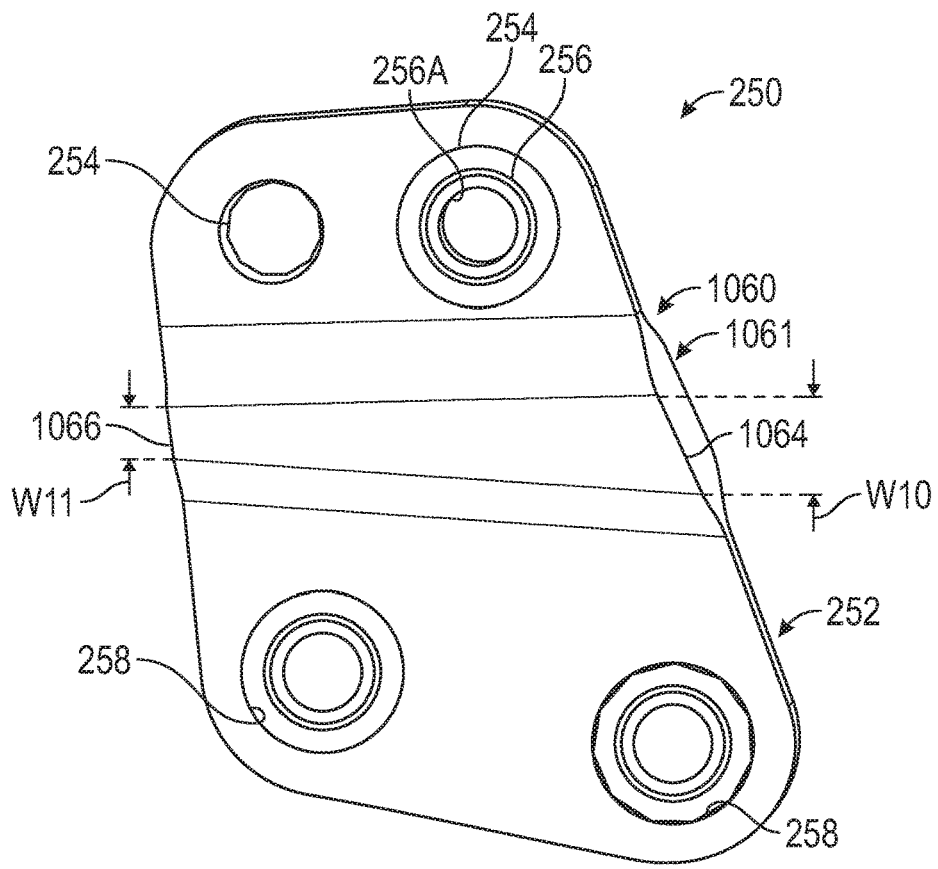
FIG. 13 is a side view of the vehicle bracket of FIG. 11.

It should be noted that in other embodiments, the mount 200 may be configured differently to couple the gas turbine engine 100 to the vehicle 122. With reference to FIG. 8, a mount 800 is shown. As the mount 800 may include some of the same features as the mount 200 discussed with regard to FIGS. 1-7B, the same reference numerals will be used to denote the same features and as these features are the same they will not be discussed in detail herein. In this example, the mount 800 includes the engine bracket 202, the vehicle bracket 204, the pair of first fastener assemblies 206, one second fastener assembly 208 and one fastener assembly 802. As discussed with regard to FIGS. 1-7B, the engine bracket 202 includes the body 210 having the first member 212 and the second member 214. The first member 212 is coupled to the second member 214 to define the receptacle 228 that receives the vehicle bracket 204. The bores 235, 236 each receive a portion of the first fastener assemblies 206 for coupling the engine bracket 202 to the outer bypass duct 110.

The pair of first fastener assemblies 206 couple the engine bracket 202 to the outer bypass duct 110. The second fastener assembly 208 couples the vehicle bracket 204 to the engine bracket 202. In one example, the second fastener assembly 208 is received through one of the bracket coupling bores 220, 242 and the throughbore 256a of the spherical bearing 256 to couple the vehicle bracket 204 to the engine bracket 202. In this example, the fastener assembly 802 is received through the other one of the bracket coupling bores 220, 242 and to couple the vehicle bracket 204 to the engine bracket 202. Optionally, the fastener assembly 802 may also be received through one of the bracket coupling bores 220, 242 and the throughbore 256a of the spherical bearing 256. In this example, the fastener assembly 802 includes a pin 804. The pin 804 is received within the bracket coupling bores 220, 242 to couple the vehicle bracket 204 to the engine bracket 202.

As the assembly of the mount 800 and the use of the mount 800 to couple the gas turbine engine 100 to the vehicle 122 is substantially similar to the assembly of the mount 200 and the use of the mount 200 to couple the gas turbine engine 100 to the vehicle 122, the assembly of the mount 800 and the use of the mount 800 to couple the gas turbine engine 100 to the vehicle 122 will not be discussed in great detail herein. Briefly, the pin 804 is inserted through the other one of the bracket coupling bores 220, 242 and to couple the vehicle bracket 204 to the engine bracket 202, and is removable to uncouple the gas turbine engine 100 from the vehicle 122.

It should be noted that in other embodiments, the engine bracket 202 for the mount 200 may be configured differently to couple the gas turbine engine 100 to the vehicle 122. With reference to FIGS. 9 and 10, an engine bracket 902 for use with the mount 200 is shown. In this example, the engine bracket 902 is a unitary, monolithic, or one-piece bracket, and couples to the vehicle bracket 204 (FIG. 4). The engine bracket 902 may be employed with the mount 200 to couple the mount 200 to the gas turbine engine 100 (FIG. 2). The engine bracket 902 is composed of a metal or metal alloy, including, but not limited to titanium, Inconel 718, Inconel 675, etc.; and may be cast, forged, stamped or formed through additive manufacturing.

The engine bracket 902 includes a body 910. In this example, the body 910 includes at least one groove 912. In this example, the body 910 includes a single, continuous groove 912 defined about an entirety of a perimeter 910a of the body 910. It should be noted, however, that the groove 912 need not be continuous and need not extend about an entirety of the perimeter 910a. The groove 912 provides for a damage tolerant engine bracket, as an issue with one portion of the body 910 does not propagate to the remainder of the body 910 as it is interrupted by the groove 912. This ensures that a connection remains between the gas turbine engine 100 and the vehicle 122 (FIG. 2). The body 910 may configured as a split clevis. The body 910 includes a first end 914 opposite a second end 916, a planar portion 918 and an offset portion 920. The first end 914 may be offset from the second end 916 such that the body 910 may be curved or arcuate to conform with the curvature of the outer bypass duct 110 (FIG. 2). The first end 914 defines a bore 922, and the second end 916 defines a bore 924. The bores 922, 924 each receive a portion of the first fastener assemblies 206 for coupling the engine bracket 902 to the outer bypass duct 110. In one example, each of the bores 922, 924 define a groove 922a, 924a about an inner periphery or circumference of the respective bore 922, 924. The grooves 922a, 924a provide for damage tolerance for the bores 922, 924 by inhibiting the propagation of an issue through the body 910.

The planar portion 918 is generally flat or planar. Generally, the planar portion 918 is directly coupled to the offset portion 920 at the first end 914 and the second end 916, but is spaced apart from the offset portion 920 at an intermediate portion 926 to cooperate with the second member 214 to define the receptacle 228. Thus, the intermediate portion 926 is a portion of the body 910 that is spaced apart to define the receptacle 228. The bracket coupling bores 220, 242 are defined through the body 910 at the intermediate portion 926. The bracket coupling bores 220, 242 receive at least one of the second fastener assemblies 208 to couple the vehicle bracket 204 to the engine bracket 902. Although the body 910 is shown with one of the respective bracket coupling bores 220, 242, the body 910 may include two of the bracket coupling bores 220, 242. Generally, the planar portion 918 is spaced apart from the offset portion 920 by the second distance D2, which is sized to enable the vehicle bracket 204 to be received within the receptacle 228.

The offset portion 920 defines the offset coupling portion 234 between the first end 914 and the second end 916. The offset coupling portion 234 is spaced apart from the planar portion 918 by the distance D2. The offset coupling portion 234 protrudes outwardly from the body 910 between the first end 914 and the second end 916 to define the receptacle 228. The offset coupling portion 234 may be substantially C-shaped, and may be defined by the plurality of segments 240*a*-240*c*. The first segment 240*a* is adjacent to the body 910 near or at the first end 914, and extends along the axis A, which is substantially transverse or oblique to the longitudinal axis L of the engine bracket 902. The second segment 240*b* extends from the first segment 240*a* to the third segment 240*c*. The second segment 240*b* is substantially planar, and extends along the axis A2, which is substantially parallel to the longitudinal axis L, and transverse or oblique to the axis A. The second segment 240*b* defines at least one and in this example, one bracket coupling bore 242. The third segment 240*c* extends from the second segment 240*b* to be adjacent to the body 910 near or at the second end 916. The third segment 240*c* extends at an angle or along the axis A3, which is substantially transverse or oblique to the longitudinal axis L of the engine bracket 902. In one example, the first segment 240*a* and the third segment 240*c* each extend at the angle α relative to a surface 910*b* of the body 910.

As the use of the engine bracket 902 to couple the gas turbine engine 100 to the vehicle 122 is substantially similar to the use of the engine bracket 202 to couple the gas turbine engine 100 to the vehicle 122, the use of the engine bracket 902 to couple the gas turbine engine 100 to the vehicle 122 will not be discussed in great detail herein.

It should be noted that in other embodiments, the vehicle bracket 204 for the mount 200 may be configured differently to couple the gas turbine engine 100 to the vehicle 122. With reference to FIGS. 11-14, a vehicle bracket 1004 for use with the mount 200 is shown. As the vehicle bracket 1004 may include some of the same features as the vehicle bracket 204 discussed with regard to FIGS. 1-7B, the same reference numerals will be used to denote the same features and as these features are the same they will not be discussed in detail herein. In this example, the vehicle bracket 1004 cooperates with a seal 1100, which inhibits the entry of other items into the structure 22 of the vehicle 122 while also acting as a flame arrester. The vehicle bracket 1004 is a unitary, monolithic, or one-piece bracket, and couples to the engine bracket 202 (FIG. 4). The vehicle bracket 1004 couples the mount 200 to the vehicle structure 124 of the vehicle 122 (FIG. 2). The vehicle bracket 1004 is composed of a metal or metal alloy, including, but not limited to titanium, Inconel 718, Inconel 675, etc.; and may be cast, forged, stamped or formed through additive manufacturing.

With reference to FIG. 11, the vehicle bracket 1004 is received within the receptacle 228 (FIG. 5), and thus, is received between the first member 212 and the second member 214 of the engine bracket 202 (FIG. 5). The vehicle bracket 1004 includes the first bracket end 250 opposite the second bracket end 252. The first bracket end 250 is offset from the second bracket end 252 to enable axial misalignment between the gas turbine engine 100 and the vehicle structure 124 (FIG. 2). The first bracket end 250 includes the at least one, and in this example, the two vehicle bracket coupling bores 254. The vehicle bracket coupling bores 254 receive a portion of a respective one of the pair of second fastener assemblies 208 to couple the vehicle bracket 1004 to the engine bracket 202. In one example, at least one of the vehicle bracket coupling bores 254 include the spherical bearing 256. It should be noted that while one of the vehicle bracket coupling bores 254 is shown with the spherical bearing 256, each of the vehicle bracket coupling bores 254 may receive the spherical bearing 256. As discussed, the spherical bearing 256 includes the throughbore 256*a*, which enables the receipt of a fastener, such as a portion of one of the first fastener assemblies 206 or one of the second fastener assemblies 208 to be received therethrough.

The second bracket end 252 includes the at least one, and in this example, the two vehicle coupling bores 258. The vehicle coupling bores 258 receive a portion of a respective one of the pair of vehicle fasteners 259 (FIG. 2) to couple the vehicle bracket 1004 to the vehicle structure 124 (FIG. 2). In one example, each of the vehicle coupling bores 258 include the spherical bearing 256. In one example, the spherical bearing 256 is swaged into the respective vehicle coupling bores 258 to retain the spherical bearing 256 within the respective vehicle coupling bores 258. In certain instances, the spherical bearings 256 of the vehicle bracket 1004 may have different sizes depending upon the configuration of the vehicle bracket 1004. Generally, the mount 200 includes a total of at least three spherical bearings 256, which may be coupled to the vehicle bracket 1004, the engine bracket 202 or a combination of vehicle bracket 1004 and the engine bracket 202.

Figure 15:
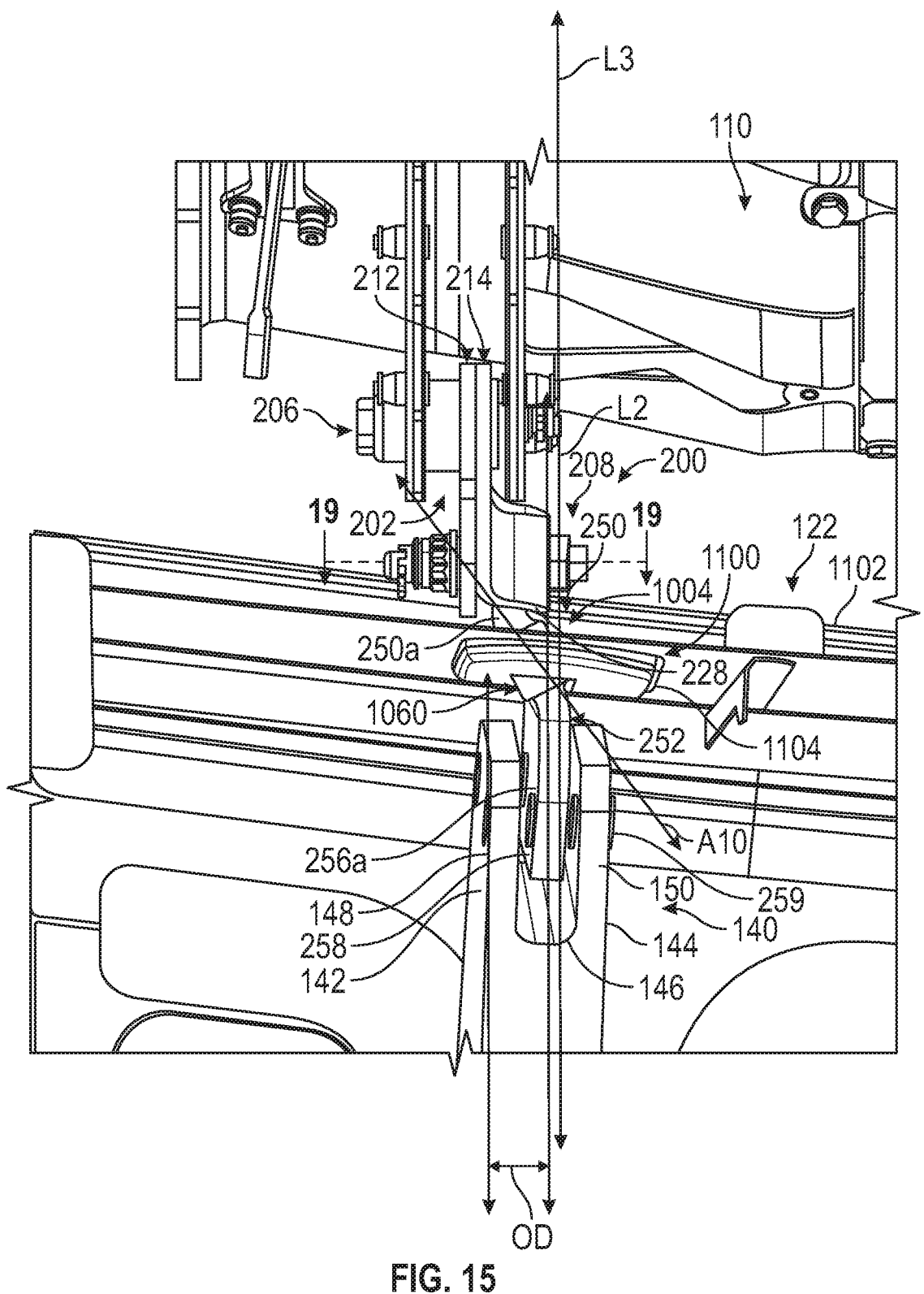
FIG. 15 is a side view of the mount, including the vehicle bracket of FIG. 11, coupled to the gas turbine engine and the vehicle structure, the mount passing through an exemplary seal associated with the vehicle structure, and illustrating an offset dimension provided by the mount including the vehicle bracket of FIG. 11, in accordance with various embodiments.

In one example, an intermediate bracket segment 1060 interconnects the first bracket end 250 and the second bracket end 252. Generally, the surface 250*b* of the first bracket end 250 is offset from the surface 252*b* of the second bracket end 252 by the intermediate bracket segment 1060. The surface 250*b* comprises the mount plane for the gas turbine engine 100, and the surface 252*b* defines the mount plane for the vehicle 122, and the offset between these surfaces 250*b*, 252*b*, which are interconnected by the intermediate bracket segment 1060, results in or enables an offset between the gas turbine engine 100 and the vehicle 122. In one example, with reference to FIG. 11, the intermediate bracket segment 1060 includes a seal coupling portion 1062. The seal coupling portion 1062 extends outwardly from opposed sides 1060*a*, 1060*b* of the intermediate bracket segment 1060 to interface with the seal 1100 (FIG. 15). In one example, the seal coupling portion 1062 extends outwardly from the opposed sides 1060*a*, 1060*b* for a distance D10. As will be discussed, the extension of the seal coupling portion 1062 away from the sides 1060*a*, 1060*b* cooperates with the seal 1100 (FIG. 15) to inhibit a propagation of a thermal event into the vehicle structure 124 (FIG. 15).

The seal coupling portion 1062 may also taper from a first side 1064 to a second side 1066 of the intermediate bracket segment 1060. In this regard, with reference to FIG. 13, a width W10 of the seal coupling portion 1062 at the first side 1064 may be greater than a width W11 of the seal coupling portion 1062 at the second side 1066. This cooperates with a shape of the seal 1100 (FIG. 15) to maintain a gap between the seal 1100 and the seal coupling portion 1062, as will be discussed further herein.

Figure 14:
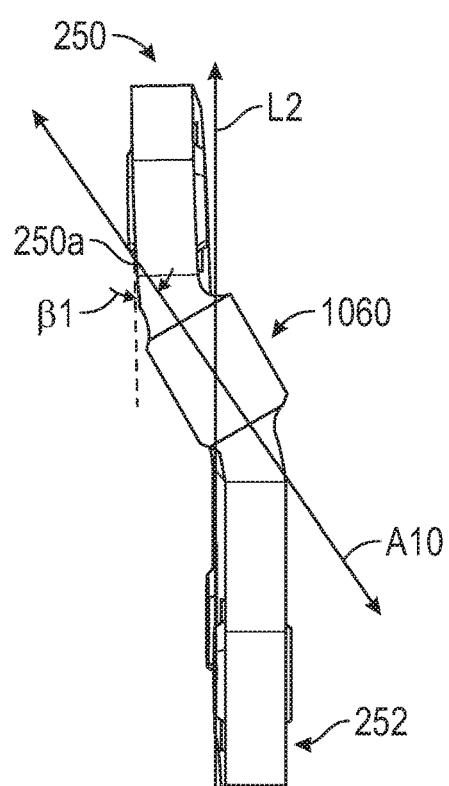
FIG. 14 is a top view of the vehicle bracket of FIG. 11.

With reference to FIG. 14, the intermediate bracket segment 1060 extends along an axis A10, which is transverse or oblique to the longitudinal axis L2 of the vehicle bracket 1004. Thus, the first bracket end 250 is offset from the second bracket end 252 along the longitudinal axis L2. In one example, the intermediate bracket segment 1060 extends at an angle β1 relative to the surface 250a of the first bracket end 250. In one example, the angle β1 is about 10 degrees to about 30 degrees based on the predetermined amount of offset desired. It should be noted that the angle β1 may be variable to account for vehicle structures associated with different vehicles.

In this regard, the intermediate bracket segment 1060 enables the mount 200 to be coupled to the vehicle 122 in instances where the vehicle 122 is axially misaligned with the gas turbine engine 100. Depending upon the vehicle structure 124, the intermediate bracket segment 1060 may be angled at the angle β1 for a predefined amount to enable coupling of the mount 200 to the vehicle structure 124. Thus, the mount 200 may be employed to couple the gas turbine engine 100 to the vehicle structure 124 in instances where the vehicle structure 124 and the gas turbine engine 100 are axially misaligned by compensating for the misalignment with the vehicle bracket 204. In one example, the mount 200 including the vehicle bracket 1004 enables the gas turbine engine 100 to be axially offset from the vehicle structure 124 by the offset dimension OD (FIG. 15), and the vehicle bracket 1004 enables the use of the seal 1100 (FIG. 15) about the mount 200, which inhibits objects from entering the vehicle structure 124 while also acting as a flame arrester, as will be discussed.

As the use of the vehicle bracket 1004 to couple the gas turbine engine 100 to the vehicle 122 is substantially similar to the use of the vehicle bracket 204 to couple the gas turbine engine 100 to the vehicle 122, the use of the vehicle bracket 1004 to couple the gas turbine engine 100 to the vehicle 122 will not be discussed in great detail herein.

As discussed, the mount 200 may be configured with the vehicle bracket 1004 to interface with the seal 1100 to couple the gas turbine engine 100 to the vehicle 122. With reference to FIG. 15, the mount 200, including the engine bracket 202 and the vehicle bracket 1004, is shown with the seal 1100 for coupling the gas turbine engine 100 to the vehicle 122. In this example, the vehicle 122 includes a firewall 1102, which inhibits a thermal event. In order to enable the mount 200 to couple the gas turbine engine 100 to the vehicle 122, the firewall 1102 includes an access opening or opening 1104. The seal 1100 is coupled about the opening 1104 and the mount 200 to inhibit items from entering the vehicle 122, and also serves as a flame arrester. As shown in FIG. 15, a portion of the seal 1100 may be received within and through the opening 1104, such that a portion of the seal 1100 may be recessed relative to the firewall 1102. The seal 1100 encloses at least a portion of the opening 1104.

Figure 16:
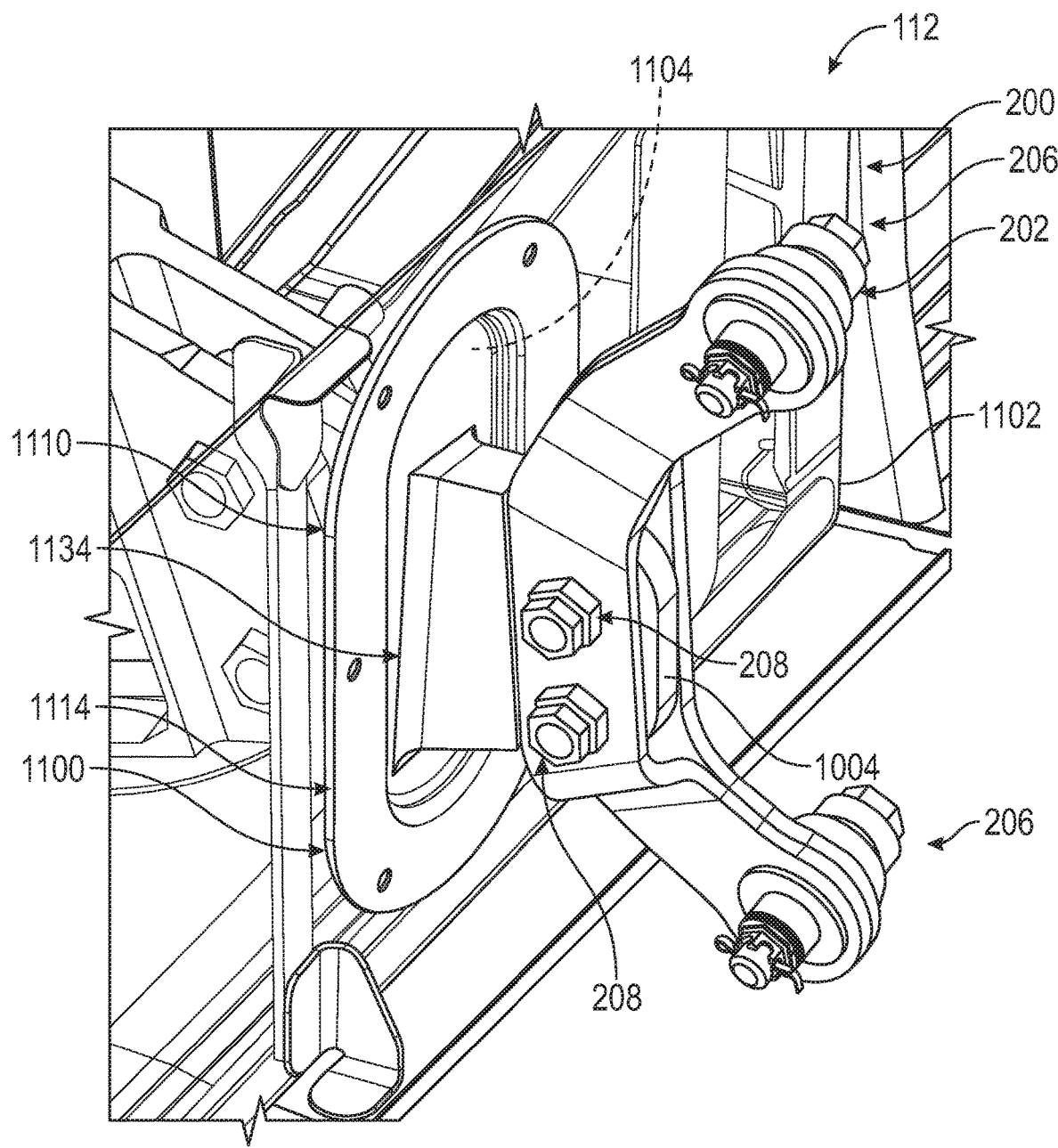
FIG. 16 is a perspective view of the mount, including the vehicle bracket of FIG. 11, coupled to the vehicle structure and passing through the seal associated with the vehicle structure, in which the gas turbine engine has been removed for clarity.

With reference to FIG. 16, a front view of the seal 1100 is shown, with the gas turbine engine 100 removed from the engine bracket 202 of the mount 200 for clarity. As shown, the portion of the seal 1100 is recessed within the opening 1104, and a portion of the seal 1100 extends about a perimeter of the opening 1104. In this example, the seal 1100 is coupled about the perimeter of the opening 1104 to enable easy servicing of the seal 1100 for repair, replacement, etc. Generally, the seal 1100 is removably coupled to the opening 1104 by one or more thermally resistant mechanical fasteners, including, but not limited to, bolts and nuts, screws, etc.

Figure 17:
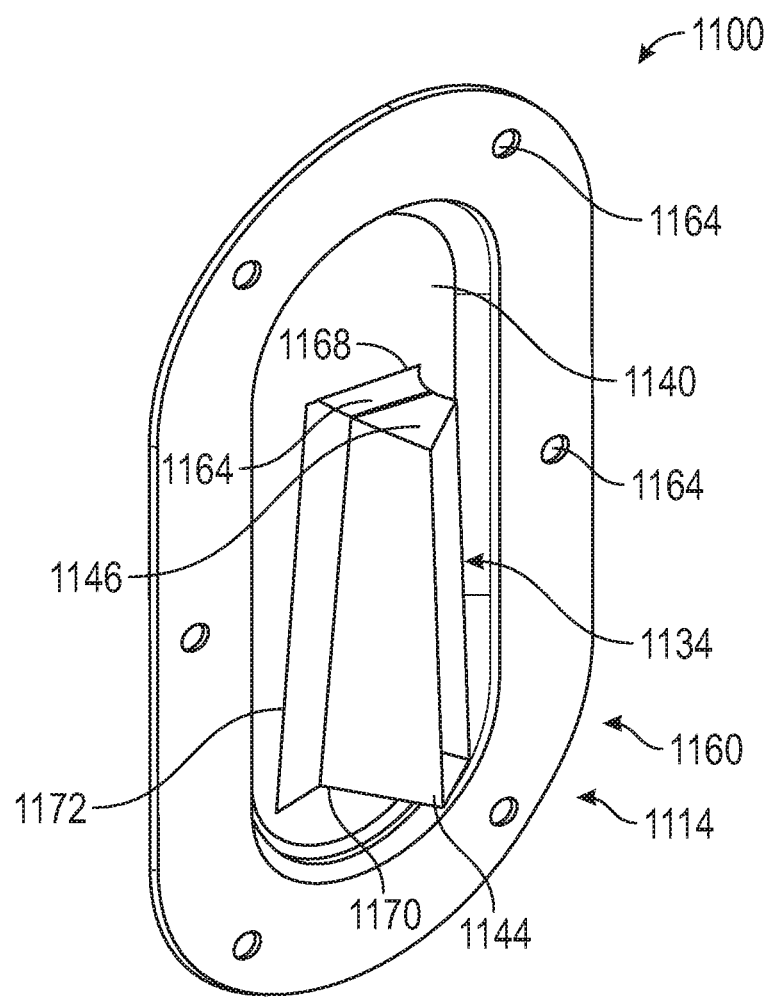
FIG. 17 is a perspective view of the seal associated with the vehicle structure of FIG. 15.
Figure 18:
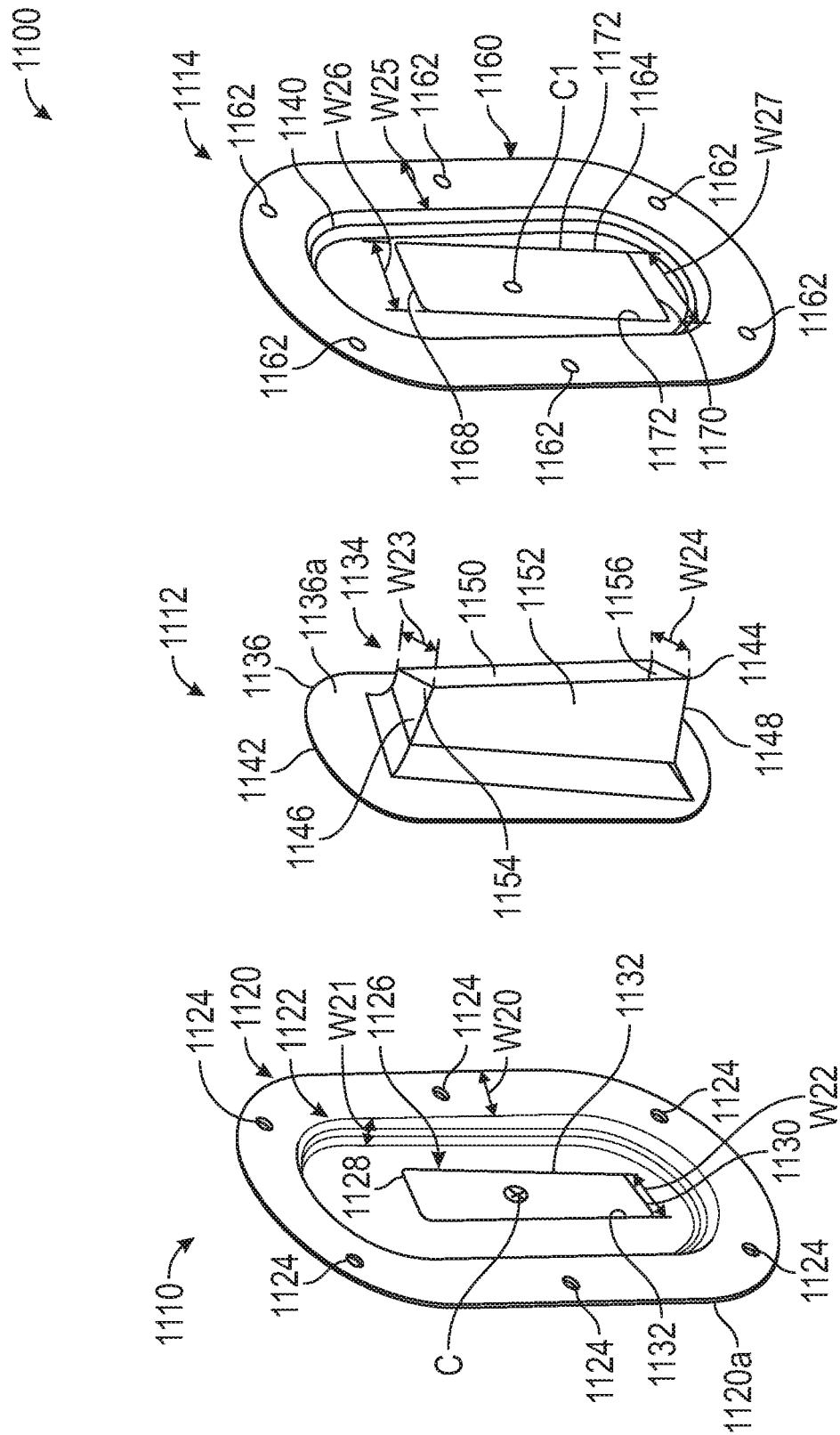
FIG. 18 is an exploded view of the seal of FIG. 17.

With reference to FIG. 17, the seal 1100 is shown. In this example, the seal 1100 is oval-shaped, however, it should be understood that the seal 1100 may have any desired shape that corresponds with a shape of the opening 1104 (FIG. 16). With reference to FIG. 18, an exploded view of the seal 1100 is shown. In one example, the seal 1100 includes a first, inner plate 1110, a second, center plate 1112 and a third, outer plate 1114. Each of the inner plate 1110, the center plate 1112 and the outer plate 1114 may be composed of a thermal resistant material, including, but not limited to, a thermal resistant metal or metal alloy, such as corrosion resistant stainless steel, stainless steel, titanium, etc. In certain embodiments, the inner plate 1110, the center plate 1112 and the outer plate 1114 may be composed of a thermal resistant polymer material, for example, a thermal resistant carbon fiber. Each of the inner plate 1110, the center plate 1112 and the outer plate 1114 are monolithic or one-piece, and may be formed through stamping, casting, forging, machining, additive manufacturing, composite ply lay-up etc. Generally, the use of the thermal resistant metal or metal alloy ensures that the seal 1100 meets or exceeds thermal resistance standards, such as kerosene testing, for example. It should be noted that while the seal 1100 is shown and described herein as including the inner plate 1110, the center plate 1112 and the outer plate 1114, the seal 1100 may include additional center plates 1112, for example, to increase a number of layers between the inner plate 1110 and the outer plate 1114 to increase thermal resistance, if desired.

Figure 19:
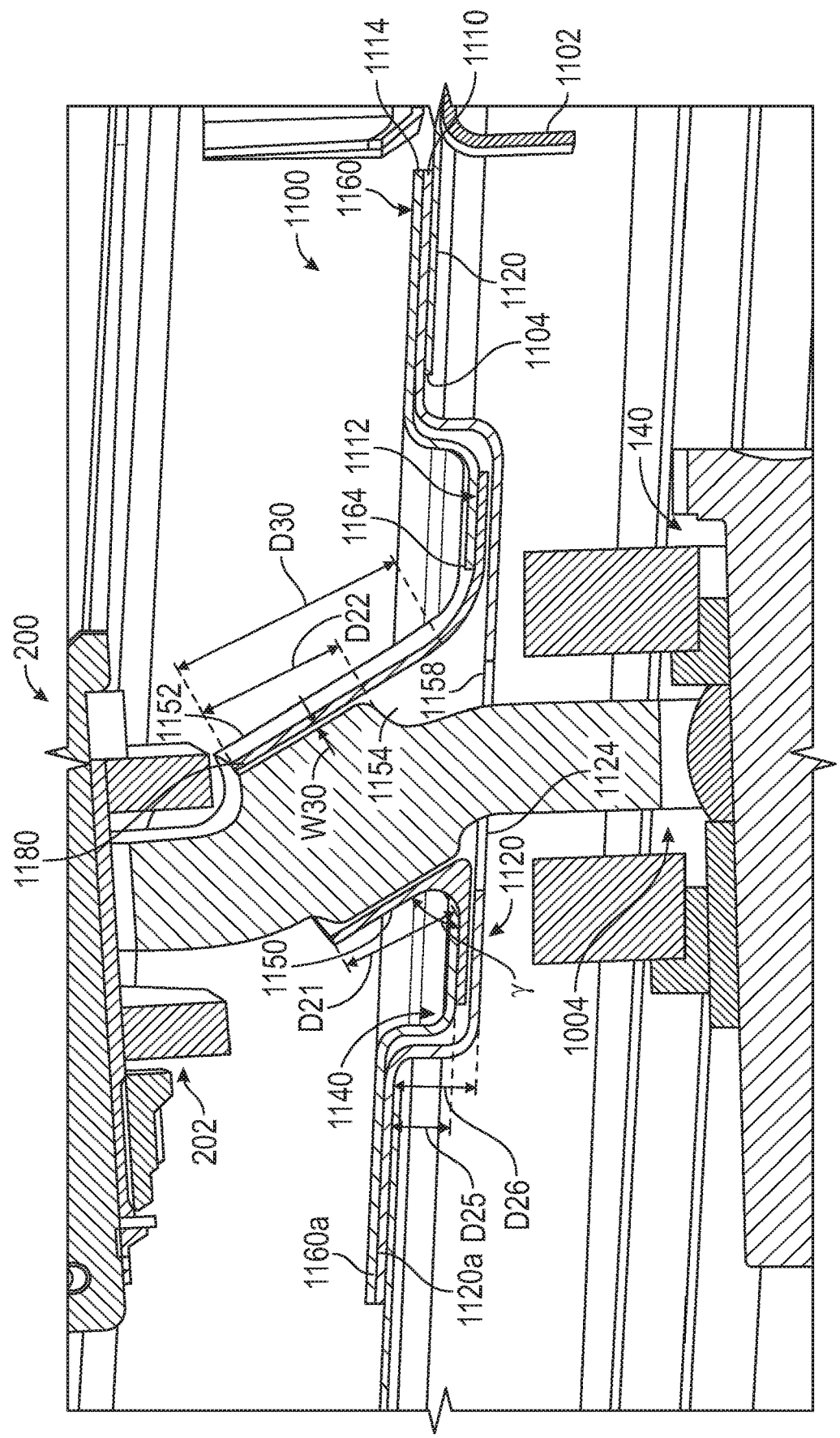
FIG. 19 is a partial cross-sectional view, taken along line 19-19 of FIG. 15, which illustrates the vehicle bracket of FIG. 11 passing through a passage defined by a center plate of the seal of FIG. 17.

In this example, each of the inner plate 1110 and the outer plate 1114 are coupled to the firewall 1102, while the center plate 1112 is sandwiched between the inner plate 1110 and the outer plate 1114 (FIG. 19). By sandwiching the center plate 1112 between the inner plate 1110 and the outer plate 1114, the center plate 1112 may move slightly between the inner plate 1110 and the outer plate 1114 to accommodate thermal growth, for example. The inner plate 1110 is oval-shaped, and includes a first plate or inner plate flange 1120 and a first plate or inner plate body 1122.

The inner plate flange 1120 extends about a perimeter of the inner plate body 1122. In this example, the inner plate flange 1120 extends outwardly from the perimeter of the inner plate body 1122 for a width W20. The inner plate flange 1120 defines at least one or a plurality of inner coupling bores 1124, which are spaced apart along the perimeter of the inner plate flange 1120. Generally, the inner coupling bores 1124 are defined through the inner plate flange 1120 proximate or near an edge of the inner plate flange 1120. In this example, the inner plate flange 1120 defines six inner coupling bores 1124; however, any number of inner coupling bores 1124 may be employed.

The inner plate body 1122 is recessed relative to the inner plate flange 1120. In other words, with reference to FIG. 19, the inner plate body 1122 is defined below a surface 1120a of the inner plate flange 1120. Generally, the inner plate body 1122 is recessed a distance D20 beneath the surface 1120a such that the inner plate 1110 is recessed relative to the opening 1104 when the inner plate 1110 is coupled to the opening 1104. With reference back to FIG. 18, the inner plate body 1122 defines a slot 1126. The slot 1126 is offset from a centerline C of the inner plate 1110. It should be noted that the slot 1126 is offset from the centerline C in this example to ensure that as the vehicle bracket 1004 passes through the seal 1100, the vehicle bracket 1004 may be coupled to the vehicle structure 124 (FIG. 15). In other embodiments, the slot 1126 may be centered relative to the centerline C.

The slot 1126 has a first side 1128 opposite a second side 1130, which are interconnected by sidewalls 1132. The slot 1126 tapers or extends from the first side 1128 to the second side 1130 and in one example, a width W21 of the slot 1126 at the first side 1128 is different, and greater than, a width W22 of the slot 1126 at the second side 1130. The shape of the slot 1126 corresponds with the shape of a guide 1134 of the center plate 1112, and also with the shape of the intermediate bracket segment 1060 of the vehicle bracket 1004 (FIG. 15).

The center plate 1112 is sandwiched between the inner plate 1110 and the outer plate 1114 so that the center plate 1112 may move relative to the inner plate 1110 and the outer plate 1114. The center plate 1112 includes a center plate body 1136 that defines the guide 1134. The center plate body 1136 is sized to be received between the inner plate body 1122 and a third plate or outer plate body 1140 of the outer plate 1114. Thus, the center plate body 1136 has a major axis that is different than, and smaller than, a major axis of the inner plate body 1122 and the outer plate body 1140. The guide 1134 extends outwardly from a surface 1136a of the center plate body 1136. In one example, with reference to FIG. 19, the guide 1134 is defined at an angle γ relative to the surface 1136a, and the angle γ is about 30 degrees to about 90 degrees. With reference back to FIG. 18, the guide 1134 may be offset from a centerline of the center plate 1112 to be coaxially aligned with the slot 1126.

The guide 1134 has a first end 1142 opposite a second end 1144. The guide 1134 curves from the first end 1142 to the second end 1144. Generally, the guide 1134 curves from the first end 1142 to the second end 1144 to follow the curvature of the intermediate bracket segment 1060 of the vehicle bracket 1004. The guide 1134 also includes a first side 1146 opposite a second side 1148. The guide 1134 tapers or extends from the first side 1146 to the second side 1148 and in one example, a width W23 of the guide 1134 at the first side 1146 is different, and greater than, a width W24 of the guide 1134 at the second side 1148. The shape of the guide 1134 corresponds with the shape of the slot 1126 of the inner plate 1110, and also with the shape of the intermediate bracket segment 1060 of the vehicle bracket 1004 (FIG. 15). The guide 1134 has a first sidewall 1150 opposite a second sidewall 1152, and a third sidewall 1154 opposite a fourth sidewall 1156. The first sidewall 1150 interconnects the third sidewall 1154 and the fourth sidewall 1156. With reference to FIG. 19, the first sidewall 1150 extends for a distance D21, which inhibits the propagation of a thermal event. The second sidewall 1152 interconnects the third sidewall 1154 and the fourth sidewall 1156. With reference to FIG. 19, the second sidewall 1152 extends for a distance D22, which also inhibits the propagation of a thermal event. The first sidewall 1150, the second sidewall 1152, the third sidewall 1154 and the fourth sidewall 1156 cooperate to define a passage 1158 that extends through the center plate 1112 (FIG. 19). The passage 1158 enables the vehicle bracket 1004 to extend through the seal 1100.

The outer plate 1114 is oval-shaped, and includes a third plate or outer plate flange 1160 and the outer plate body 1140. The outer plate flange 1160 extends about a perimeter of the outer plate body 1140. In this example, the outer plate flange 1160 extends outwardly from the perimeter of the outer plate body 1140 for a width W25. The outer plate flange 1160 defines at least one or a plurality of outer coupling bores 1162, which are spaced apart along the perimeter of the outer plate flange 1160. Generally, the outer coupling bores 1162 are defined through the outer plate flange 1160 proximate or near an edge of the outer plate flange 1160. In this example, the outer plate flange 1160 defines six outer coupling bores 1162; however, any number of outer coupling bores 1162 may be employed. The outer coupling bores 1162 are coaxially aligned with the inner coupling bores 1124 when the seal 1100 is assembled.

The outer plate body 1140 is recessed relative to the outer plate flange 1160. In other words, with reference to FIG. 19, the outer plate body 1140 is defined below a surface 1160a of the outer plate flange 1160. Generally, the outer plate body 1140 is recessed a distance D25 beneath the surface 1160a such that the outer plate 1114 is recessed relative to the opening 1104 when outer inner plate 1114 is coupled to the opening 1104. With reference back to FIG. 18, the outer plate body 1140 defines an outer slot 1164. The outer slot 1164 is offset from a centerline C1 of the outer plate 1114. It should be noted that the outer slot 1164 is offset from the centerline C1 in this example to ensure that as the vehicle bracket 1004 passes through the seal 1100, the vehicle bracket 1004 may be coupled to the vehicle structure 124 (FIG. 15). In other embodiments, the outer slot 1164 may be centered relative to the centerline C. The outer slot 1164 is in coaxially aligned with the guide 1134 to enable the guide 1134 to pass through the outer slot 1164 when the seal 1100 is assembled.

The outer slot 1164 has a first side 1168 opposite a second side 1170, which are interconnected by sidewalls 1172. The outer slot 1164 tapers or extends from the first side 1168 to the second side 1170 and in one example, a width W26 of the outer slot 1164 at the first side 1168 is different, and greater than, a width W27 of the outer slot 1164 at the second side 1170. The shape of the outer slot 1164 corresponds with the shape of the guide 1134 of the center plate 1112, and also with the shape of the intermediate bracket segment 1060 of the vehicle bracket 1004 (FIG. 15). The guide 1134 of the center plate 1112 is received through the outer slot 1164 when the seal 1100 is assembled.

In one example, with reference to FIG. 19, in order to assemble the seal 1100, with the inner plate 1110, the center plate 1112 and the outer plate 1114 formed, the inner plate 1110 is positioned within the opening 1104 defined in the firewall 1102. The center plate 1112 is positioned within the inner plate body 1122 such that the slot 1126 is aligned and in communication with the passage 1158 of the guide 1134. The outer plate 1114 is positioned over the center plate 1112 such that the guide 1134 is received through the outer slot 1164. With the inner coupling bores 1124 and the outer coupling bores 1162 coaxially aligned, mechanical fasteners, for example, bolts, are inserted through the outer coupling bores 1162 and the inner coupling bores 1124 and secured with nuts to couple the seal 1100 to the firewall 1102.

With reference to FIG. 15, in order to couple the gas turbine engine 100 to the vehicle 122 with the seal 1100 coupled to the opening 1104, the engine bracket 202 is coupled to the gas turbine engine 100 as discussed with regard to FIG. 7A, blocks 704-706. The vehicle bracket 1004 is then coupled to the vehicle structure 124. In one example, the vehicle bracket 1004 is received through the slot 1126 of the inner plate 1110 and the passage 1158 of the guide 1134 (FIG. 19) so that the second bracket end 252 of the vehicle bracket 1004 is received within the flange 140. With the vehicle coupling bores 258 and the throughbores 256a of the spherical bearings 256 coaxially aligned with the openings 148, 150 in the flange 140, the vehicle fasteners 259 are inserted through the openings 148, 150 in the flange 140 and the throughbores 256a of the spherical bearings 256 to couple the vehicle structure 124 to the vehicle bracket 204. The first bracket end 250 of the vehicle bracket 1004 is positioned into the receptacle 228. The second fastener assemblies 208 are used to couple the vehicle bracket 1004 to the engine bracket 202. Generally, the mount 200 couples the gas turbine engine 100 to the vehicle 122 such that the gas turbine engine 100 is offset along the longitudinal axis L3 extending along the gas turbine engine 100 and the vehicle structure 124.

With reference to FIG. 19, the passage 1158 of the guide 1134 defined by the seal 1100 has a shape that corresponds with or substantially matches a shape of the structure passing through it, in this example, the intermediate bracket segment 1060 of the vehicle bracket 1004 to inhibit a propagation of a thermal event. In this regard, a gap 1180 is defined between the intermediate bracket segment 1060 and the guide 1134. The gap 1180 is defined about each side of the intermediate bracket segment 1060 to enable the vehicle bracket 1004 to move axially and radially relative to the seal 1100 to account for thermal expansion, for example. In one example, the vehicle bracket 1004 may move about 0.001 inches (in.) to about 0.005 inches (in.) radially, and may move about 0.002 inches (in.) to about 0.075 inches (in.) axially. The gap 1180 has a width W30. The width W30 of the gap 1180 also cooperates with a distance D30 to inhibit the propagation of a thermal event. Generally, a ratio of at least ten to about one exists between a length of the distance D30 in inches (in.) and the width W30 of the gap 1180 in inches (in.). This ratio of at least 10:1 (length of distance D30:width W30 of the gap 1180) ensures that a thermal event does not propagate into the firewall 1102, and thus, acts as a flame arrester. Generally, the guide 1134 extends from the center plate 1112 for a length that is sufficient to inhibit a thermal event. Thus, the seal 1100 and the vehicle bracket 1004 assist in coupling the gas turbine engine 100 to the vehicle 122, while also inhibiting a propagation of a thermal event through the firewall 1102.

Figure 20:
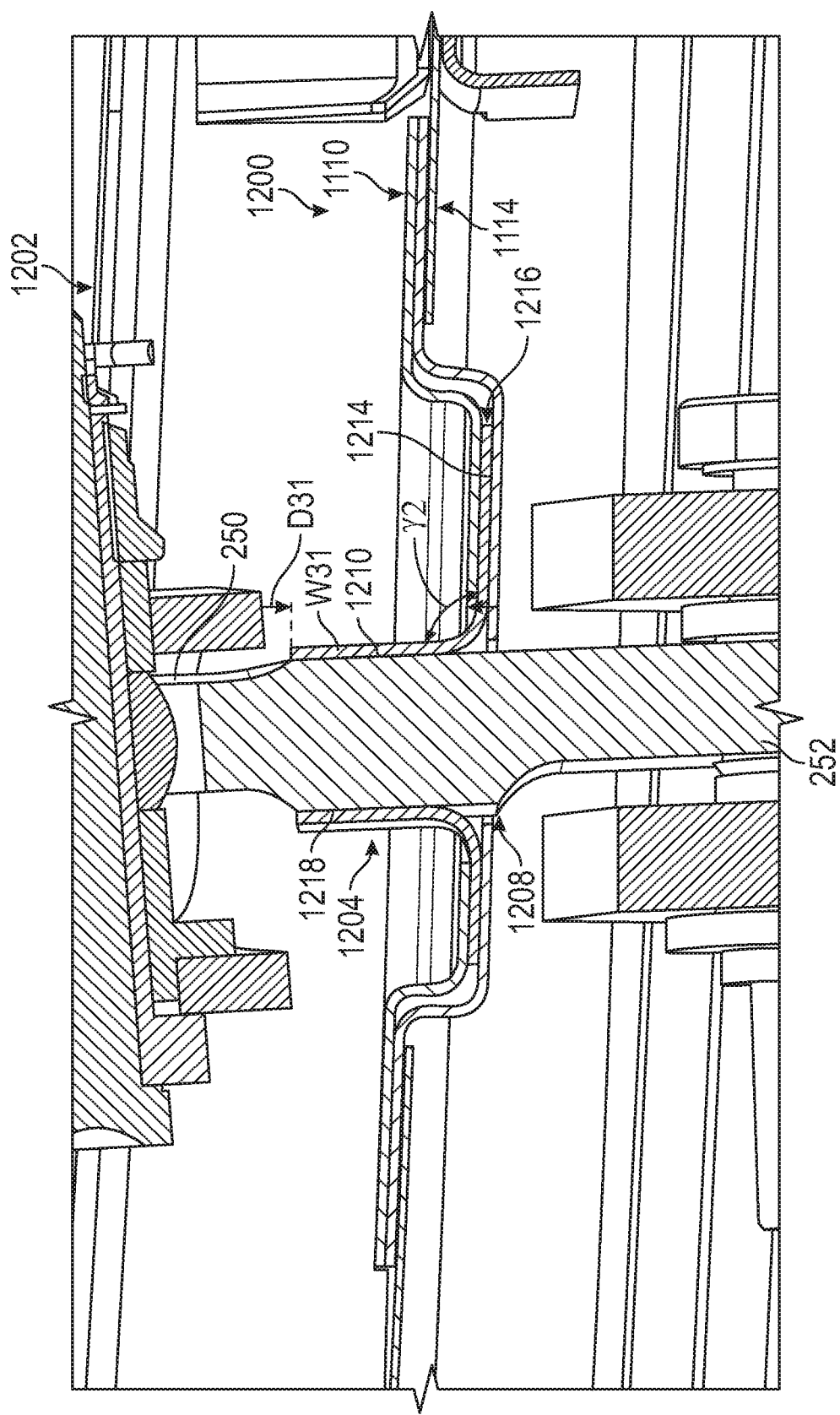
FIG. 20 is a partial cross-sectional view of another exemplary vehicle bracket for use with the mount of FIG. 1 and another exemplary seal for use with the exemplary vehicle bracket.

As discussed, the passage 1158 of the guide 1134 of the seal 1100 may have a shape that corresponds with the structure passing through it, and thus, it should be understood that the seal 1100 may be configured differently to inhibit the propagation of a thermal event and to inhibit objects from entering the opening 1104. In this regard, with reference to FIG. 20, a seal 1200 for use with a mount 1202 is shown. The mount 1202 couples the gas turbine engine 100 to the vehicle 122, and includes the engine bracket 202 and a vehicle bracket 1204. As the vehicle bracket 1204 is substantially similar to the vehicle bracket 1004, with the exception of the shape of the intermediate bracket segment 1060, the vehicle bracket 1204 will not be discussed in detail herein. Briefly, in this example, the vehicle bracket 1204 includes an intermediate bracket portion 1208, which has a seal coupling portion 1210. The intermediate bracket portion 1208 is substantially planar, such that the first bracket end 250 is not offset from the second bracket end 252. The seal coupling portion 1210 extends outwardly from the intermediate bracket portion 1208 to interface with the seal 1200.

As the seal 1200 is substantially similar to the seal 1100, with the exception of the shape of the guide 1134, the seal 1200 will not be discussed in detail herein. Briefly, as the intermediate bracket portion 1208 is substantially planar, the seal 1200 include a guide 1212 that extends outwardly from a surface 1214 of a center plate 1216 at an angle γ2 of about 90 degrees. A gap 1218 is defined between the guide 1212 and the intermediate bracket portion 1208. The shape of the guide 1212 ensures that the ratio of about ten to about one exists between a length of a distance D31 in inches (in.) and a width W31 of the gap 1180 in inches (in.). This ratio of 10:1 (length of distance D31:width W31 of the gap 1218) ensures that a thermal event does not propagate into the firewall 1102, and thus, acts as a flame arrester.

Figure 21:
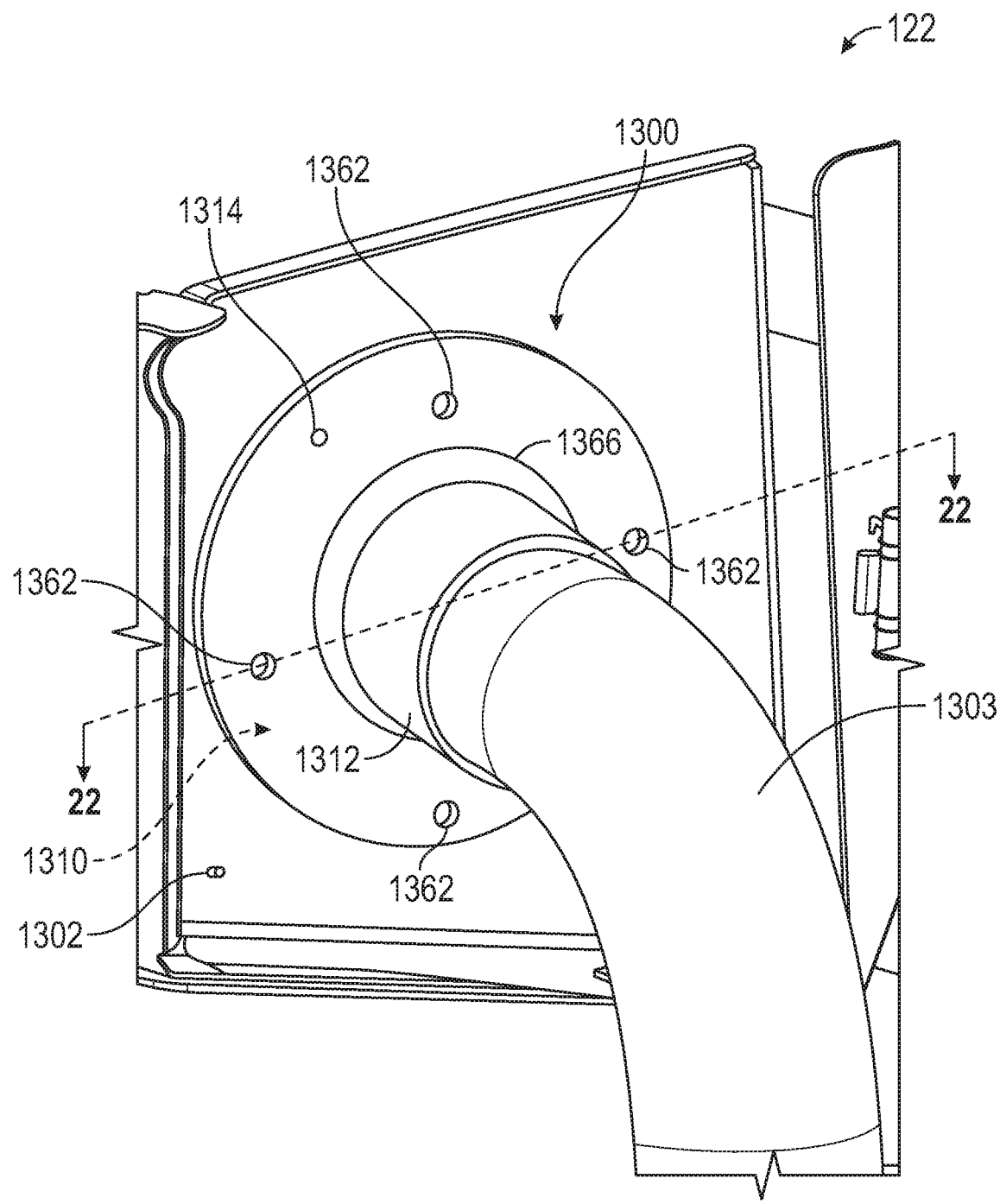
FIG. 21 is a rear perspective view of another exemplary seal for enabling an annular structure, such as a duct, to enter the vehicle structure in accordance with various embodiments.
Figure 22:
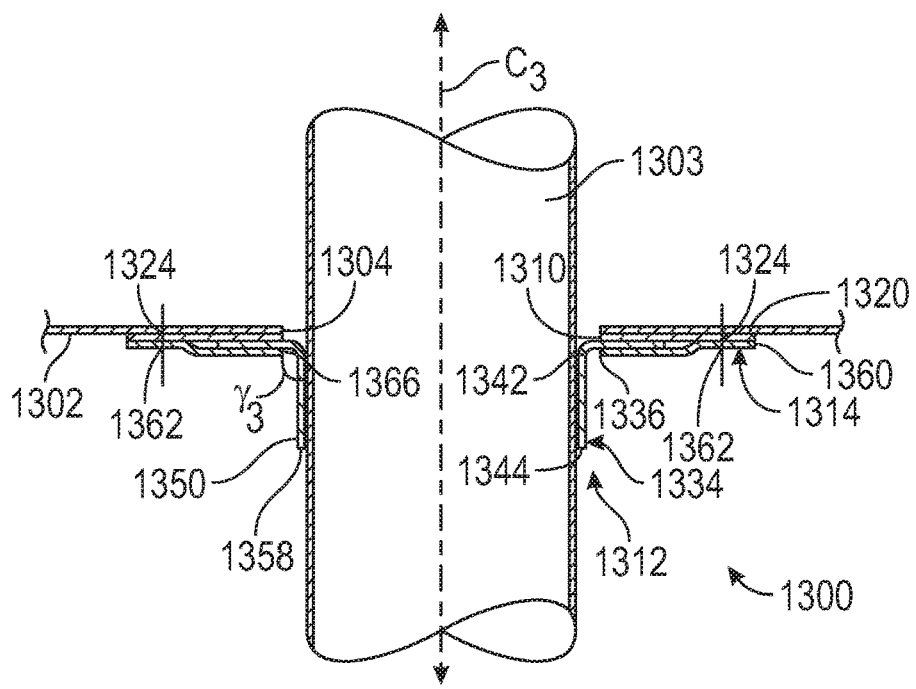
FIG. 22 is a cross-sectional view of the seal and annular structure of FIG. 21, taken along line 22-22 of FIG. 21.

It should be noted that in other embodiments, the seal 1100 may be configured differently to enable objects to pass through an opening defined in a firewall of a vehicle, such as the vehicle 122 (FIG. 2). With reference to FIG. 21, a seal 1300 is shown. As the seal 1300 may include some of the same features as the seal 1300 discussed with regard to FIGS. 15-19, the same reference numerals will be used to denote the same features and as these features are the same they will not be discussed in detail herein. In this example, the vehicle 122 includes a firewall 1302, which inhibits a thermal event. In order to enable a duct 1303 to be coupled to or enter into the vehicle 122, such as a pneumatic or hydraulic supply line, electrical wiring, fuel line, etc. for example, the firewall 1302 includes an access opening or opening 1304 (FIG. 22). The seal 1300 is coupled about the opening 1304 and the duct 1303 to inhibit items from entering the vehicle 122, and also serves as a flame arrester. As shown in FIG. 22, a portion of the seal 1300 may be received within and through the opening 1304, such that a portion of the seal 1300 may be recessed relative to the firewall 1302. As shown, the portion of the seal 1300 is recessed within the opening 1304, and a portion of the seal 1300 extends about a perimeter of the opening 1304. In this example, the seal 1300 is coupled about the perimeter of the opening 1304 to enable easy servicing of the seal 1300 for repair, replacement, etc. Generally, the seal 1300 is removably coupled to the opening 1304 by one or more thermally resistant mechanical fasteners, including, but not limited to, bolts and nuts, screws, etc.

With reference back to FIG. 21, in this example, the seal 1300 is circular, however, it should be understood that the seal 1300 may have any desired shape that corresponds with a shape of the opening 1304 (FIG. 22). With reference to FIG. 22, the seal 1300 includes a first, inner plate 1310, a second, center plate 1312 and a third, outer plate 1314. Each of the inner plate 1310, the center plate 1312 and the outer plate 1314 may be composed of a thermal resistant material, including, but not limited to, a thermal resistant metal or metal alloy, such as corrosion resistant stainless steel, stainless steel, titanium, etc. In certain embodiments, the inner plate 1310, the center plate 1312 and the outer plate 1314 may be composed of a thermal resistant polymer material, for example, a thermal resistant carbon fiber. Each of the inner plate 1310, the center plate 1312 and the outer plate 1314 are monolithic or one-piece, and may be formed through stamping, casting, forging, machining, additive manufacturing, composite ply lay-up, etc. Generally, the use of the thermal resistant metal or metal alloy ensures that the seal 1300 meets or exceeds thermal resistance standards, such as kerosene testing, for example. Each of the inner plate 1310 and the outer plate 1314 are coupled to the firewall 1302, while the center plate 1312 is sandwiched between the inner plate 1310 and the outer plate 1314. By sandwiching the center plate 1312 between the inner plate 1310 and the outer plate 1314, the center plate 1312 may move slightly between the inner plate 1310 and the outer plate 1314 to accommodate thermal growth, for example.

Figure 23:
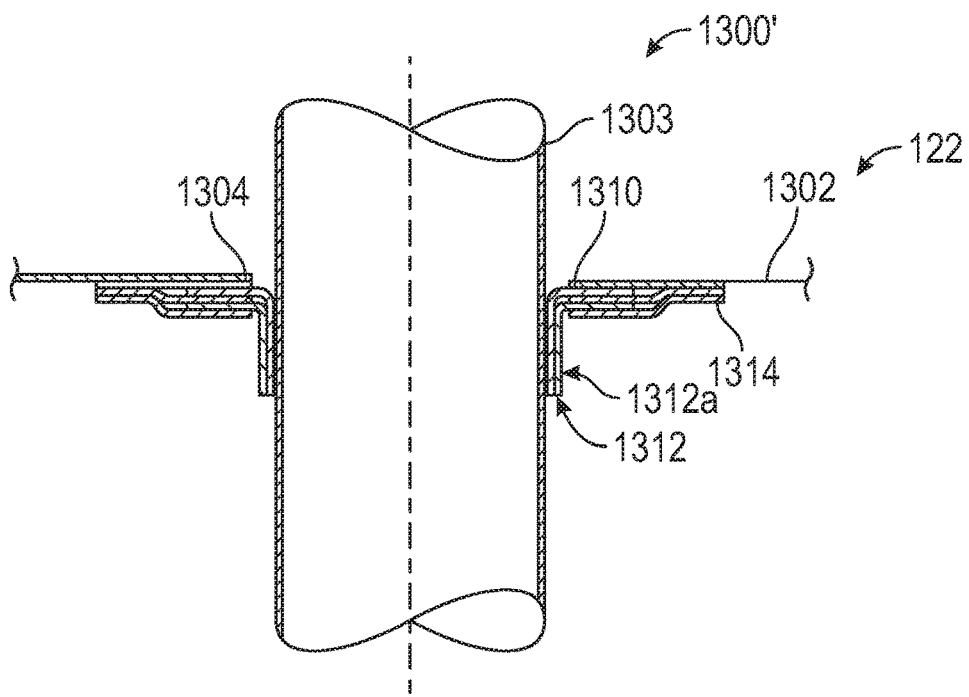
FIG. 23 is a cross-sectional view of another exemplary seal for use with the annular structure of FIG. 21, taken from the perspective of line 22-22 of FIG. 21, which includes a plurality of center plates.

It should be noted that while the seal 1300 is shown and described herein as including the inner plate 1310, the center plate 1312 and the outer plate 1314, the seal 1300 may include additional center plates 1312, for example, to increase a number of layers between the inner plate 1310 and the outer plate 1314 to increase thermal resistance, if desired. For example, with reference to FIG. 23, a seal 1300' is shown with the inner plate 1310, the outer plate 1314 and a plurality of the center plates 1312, in this example, the center plates 1312, 1312a. The additional center plate 1312a increases a thermal resistance of the seal 1300' by providing the additional layer of thermal resistant material in the opening 1304. The center plates 1312, 1312a are sandwiched between the inner plate 1310 and the outer plate 1314 to be movable relative to the inner plate 1310 and the outer plate 1314.

With reference back to FIG. 22, the inner plate 1310 is circular, and includes an inner plate flange 1320 and defines a slot 1326. The inner plate flange 1320 defines a perimeter of the inner plate 1310. In this example, the inner plate flange 1320 defines at least one or a plurality of inner coupling bores 1324, which are spaced apart along the perimeter of the inner plate flange 1120. Generally, the inner coupling bores 1324 are defined through the inner plate flange 1320 proximate or near an edge of the inner plate flange 1320. In this example, the inner plate flange 1320 defines four inner coupling bores 1324; however, any number of inner coupling bores 1324 may be employed. The slot 1326 is defined through the inner plate 1310 along a centerline C3 of seal 1300. In other embodiments, the slot 1326 may be offset relative to the centerline C3. In this example, the slot 1326 is circular to define an opening to receive the duct 1303. It should be understood, however, that the slot 1326 may have any desired shape. The shape of the slot 1326 corresponds with the shape of a guide 1334 of the center plate 1312, and also with the shape of the duct 1303.

The center plate 1312 is sandwiched between the inner plate 1310 and the outer plate 1314 so that the center plate 1312 may move relative to the inner plate 1310 and the outer plate 1314. The center plate 1312 includes a center plate body 1336 that defines the guide 1334. The center plate body 1336 is sized to be received between the inner plate 1310 and the outer plate 1314. Thus, the center plate body 1336 has a diameter that is different than, and smaller than, a diameter of the inner plate 1310 and the outer plate 1314. The guide 1334 extends outwardly from a surface 1336a of the center plate body 1336. In one example, the guide 1334 is defined at an angle γ3 relative to the surface 1336a, and the angle γ3 is about 45 degrees to about 90 degrees. In the example of FIG. 22, angle γ3 is about 90 degrees. The guide 1334 is coaxial with the centerline C3 the seal 1300 to be coaxially aligned with the slot 1326.

The guide 1334 has a first end 1342 opposite a second end 1344. The guide 1334 extends substantially linearly from the first end 1342 to the second end 1344. Generally, the guide 1334 is straight from the first end 1342 to the second end 1344 to follow the shape of duct 1303. It should be noted in other embodiments, the guide 1334 may be curved. The guide 1334 is cylindrical, and includes an annular sidewall 1350. The annular sidewall 1350 defines a passage 1358 that extends through the center plate 1312. The passage 1358 enables the duct 1303 to extend through the seal 1300.

The outer plate 1314 is circular, and includes an outer plate flange 1360 and defines an outer slot 1366. The outer plate flange 1360 defines a perimeter of the outer plate 1314. In this example, the outer plate flange 1360 defines at least one or a plurality of outer coupling bores 1362, which are spaced apart along the perimeter of the outer plate flange 1360. Generally, the outer coupling bores 1362 are defined through the outer plate flange 1360 proximate or near an edge of the outer plate flange 1360. In this example, the outer plate flange 1360 defines four outer coupling bores 1362; however, any number of outer coupling bores 1362 may be employed (FIG. 21). The outer slot 1366 is defined through the outer plate 1314 along the centerline C3 of the seal 1300. In other embodiments, the outer slot 1366 may be offset relative to the centerline C3. In this example, the outer slot 1366 is circular to define an opening to receive the duct 1303. It should be understood, however, that the outer slot 1366 may have any desired shape. The shape of the outer slot 1366 corresponds with the shape of the guide 1334 of the center plate 1312, and also with the shape of the duct 1303. The guide 1334 of the center plate 1312 is received through the outer slot 1366 when the seal 1300 is assembled.

In one example, in order to assemble the seal 1300, with the inner plate 1310, the center plate 1312 and the outer plate 1314 formed, the inner plate 1310 is positioned within the opening 1304 defined in the firewall 1302. The center plate 1312 is positioned within the inner plate 1310 such that the slot 1326 is aligned and in communication with the passage 1358 of the guide 1334. The outer plate 1314 is positioned over the center plate 1312 such that the guide 1334 is received through the outer slot 1366 as shown in FIG. 21. With the inner coupling bores 1324 and the outer coupling bores 1362 coaxially aligned, mechanical fasteners, for example, bolts, are inserted through the outer coupling bores 1362 and the inner coupling bores 1324 and secured with nuts to couple the seal 1300 to the firewall 1302.

It should be noted that while the seal 1100, 1200 and 1300 are shown and described herein as having the inner plate 1110, 1310 and the outer plate 1114, 1314 coupled to the same side of the firewall 1102, 1302, the inner plate 1110, 1310 may be coupled to an opposed side of the firewall 1102, 1302 as the outer plate 1114, 1314, or vice versa such that the center plate 1112, 1312 is sandwiched between a respective one of the inner plate 1110, 1310 (or the outer plate 1114, 1314) and the firewall 1102, 1302.

In addition, it should be noted that the first fastener assemblies 206, the second fastener assemblies 208 and/or the vehicle fasteners 259 may be installed with a fireproof sealant to increase thermal resistance. This also maintains an integrity of the firewall 1102, 1302. In one example, the fireproof sealant may include, but is not limited to a rapid-cure silicone sealant.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A seal for a wall of a vehicle, comprising:
a first plate that defines a first slot, the first plate configured to be coupled to the wall;
a second plate that defines a guide that extends outwardly from the second plate, the second plate positioned adjacent to the first plate such that the guide is in communication with the first slot; and
a third plate that defines a second slot that receives the guide, the third plate positioned adjacent to the second plate and configured to be coupled to the wall.

2. The seal of claim 1, wherein the first plate, the second plate and the third plate are composed of a metal or metal alloy.

3. The seal of claim 1, wherein the guide extends outwardly from the second plate at an angle.

4. The seal of claim 3, wherein the angle is between 30 degrees and 90 degrees.

5. The seal of claim 1, wherein the guide is tapered from a first side to an opposite second side.

6. The seal of claim 1, wherein the first plate includes a first plate flange and a first plate body that defines the first slot, the first plate body recessed relative to the first plate flange.

7. The seal of claim 6, wherein the third plate includes a third plate flange and a third plate body that defines the second slot, the third plate body recessed relative to the third plate flange and the second plate is sandwiched between the first plate body and the third plate body.

8. The seal of claim 1, wherein the second plate is movable relative to the first plate and the third plate.

9. A vehicle, comprising:
a wall that defines an opening;
a seal received within the opening, the seal including:
a first plate that defines a first slot, the first plate coupled to the wall such that at least a portion of the first plate is recessed relative to the opening;
a second plate that defines a guide that extends outwardly from the second plate, the second plate positioned adjacent to the first plate such that the guide is in communication with the first slot; and
a third plate that defines a second slot that receives the guide, the third plate positioned adjacent to the second plate such that the second plate is sandwiched between the first plate and the third plate, and the third plate coupled to the wall such that at least a portion of the third plate is recessed relative to the opening.

10. The vehicle of claim 9, wherein the guide extends outwardly from the second plate at an angle.

11. The vehicle of claim 10, wherein the angle is between 30 degrees and 90 degrees.

12. The vehicle of claim 9, wherein the guide is tapered from a first side to an opposite second side.

13. The vehicle of claim 9, wherein the first plate includes a first plate flange and a first plate body that defines the first slot, the first plate body recessed relative to the first plate flange.

14. The vehicle of claim 13, wherein the third plate includes a third plate flange and a third plate body that defines the second slot, the third plate body recessed relative to the third plate flange and the second plate is sandwiched between the first plate body and the third plate body.

15. The vehicle of claim 9, wherein the second plate is movable relative to the first plate and the third plate.

16. A vehicle, comprising:
an engine;
a mount for coupling the engine to a vehicle structure, the mount including a vehicle bracket having a seal coupling portion;
a wall that defines an opening, the wall positioned adjacent to the vehicle structure;
a seal received within the opening, the seal including:
a first plate that defines a first slot, the first plate coupled to the wall;
a second plate that defines a guide that extends outwardly from the second plate, the second plate positioned adjacent to the first plate such that the guide is in communication with the first slot, the guide shaped to correspond to the seal coupling portion and the seal coupling portion is configured to be received within the guide; and
a third plate that defines a second slot that receives the guide, the third plate positioned adjacent to the second plate and coupled to the wall.

17. The vehicle of claim 16, wherein the seal coupling portion is configured to be received within the guide to define a gap, and a length of the guide and a width of the gap has a ratio of at least ten to one.

18. The vehicle of claim 16, wherein the guide extends outwardly from the second plate at an angle between 30 degrees and 90 degrees.

19. The vehicle of claim 16, wherein the first plate includes a first plate flange and a first plate body that defines the first slot, the first plate body recessed relative to the first plate flange and the third plate includes a third plate flange and a third plate body that defines the second slot, the third plate body recessed relative to the third plate flange and the second plate is sandwiched between the first plate body and the third plate body.

20. The vehicle of claim 19, wherein the second plate is movable relative to the first plate and the third plate.

* * * * *